US009984176B2

(12) United States Patent
Ueda

(10) Patent No.: US 9,984,176 B2
(45) Date of Patent: May 29, 2018

(54) HASH VALUE CAPABLE OF GENERATING ONE OR MORE HASH FUNCTIONS

(71) Applicant: International Business Machines Corporation, Armonk, NY (US)

(72) Inventor: Takanori Ueda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 14/973,805

(22) Filed: Dec. 18, 2015

(65) Prior Publication Data

US 2016/0182234 A1    Jun. 23, 2016

(30) Foreign Application Priority Data

Dec. 19, 2014    (JP) .................................. 2014-257340

(51) Int. Cl.
*G06F 17/30* (2006.01)
*H04L 9/06* (2006.01)

(52) U.S. Cl.
CPC .. *G06F 17/30949* (2013.01); *G06F 17/30097* (2013.01); *H04L 9/0643* (2013.01)

(58) Field of Classification Search
CPC .............................................. G06F 17/30949
See application file for complete search history.

(56) References Cited

U.S. PATENT DOCUMENTS

| 8,655,878 B1 * | 2/2014 | Kulkarni ........... G06F 17/30424 707/736 |
| 2008/0215849 A1 * | 9/2008 | Scott ................. G06F 17/30949 711/216 |
| 2009/0037456 A1 * | 2/2009 | Kirshenbaum ... G06F 17/30097 |
| 2009/0037500 A1 * | 2/2009 | Kirshenbaum ... G06F 17/30097 |

(Continued)

FOREIGN PATENT DOCUMENTS

| JP | 07168841 | 7/1995 |
| JP | 08235060 | 9/1996 |
| JP | 2004229163 | 8/2004 |

OTHER PUBLICATIONS

Kirsch, A., et al. "The Power of One Move: Hashing Schemes for Hardware", IEEE/ACM Transactions on Networking, Dec. 28, 2010, pp. 1-14.

(Continued)

*Primary Examiner* — Simon Kanaan
(74) *Attorney, Agent, or Firm* — Fleit Gibbons Gutman Bongini Bianco PL; Jon A. Gibbons

(57) ABSTRACT

The present invention provides a method of calculating a hash value, the method making it possible to generate one or more hash functions by changing a predetermined position for selecting a bit, the length of an input key being L bits, the length of a hash value being N bits, and N≤L, the method including a computer performing calculation of a generated certain one hash function by selecting one bit present in a certain predetermined position among lower N bits of the input key, assigning the selected one bit to a bit in a certain (Continued)

predetermined position among N bits of the hash value, and repeating the selecting and the assigning a bit not selected yet in the selecting among the lower N bits of the key to the hash value until all bits not assigned yet of the hash value are assigned.

20 Claims, 21 Drawing Sheets

(56) References Cited

U.S. PATENT DOCUMENTS

| 2010/0111296 | A1* | 5/2010 | Brown | H04L 9/0643 |
| | | | | 380/28 |
| 2013/0262421 | A1* | 10/2013 | Ferguson | H04L 9/0643 |
| | | | | 707/698 |
| 2015/0281081 | A1* | 10/2015 | Rajahalme | H04L 69/324 |
| | | | | 370/392 |

OTHER PUBLICATIONS

Broder, A., et al., "Multilevel Adaptive Hashing", Proceedings of the First Annual ACM-SIAM Symposium on Discrete Algorithms, Jan. 22-24, 1990, pp. 1-11.
Altera, "3. TriMatrix Embedded Memory Blocks in Stratix IV Devices", Stratix IV Device Handbook, Dec. 2011, pp. 1-24, vol. 1.
Dhawan, U., et al., "Area-Efficient Near Associative Memories on FPGAs", Proceedings of the ACM/SIGDA international symposium on Field programmable gate arrays, Feb. 11-13, 2013, pp. 1-11.

* cited by examiner

IN CASE OF INPUT VALUE L=32 BITS, HASH VALUE N=8 BITS

INPUT VALUES (*key*) — 311
HASH VALUES *h*(*key*) — 312

| INPUT VALUES (*key*) | HASH VALUES *h*(*key*) |
|---|---|
| 3822 | 125 |
| 5751 | 217 |
| 48309 | 125 |
| 282 | 129 |
| 260328 | 212 |
| 49871 | 230 |
| 2370104 | 129 |
| .... | .... |
| 8610 | 245 |

INPUT RANDOM INPUT VALUE

Figure 3B

[Figure 8A]
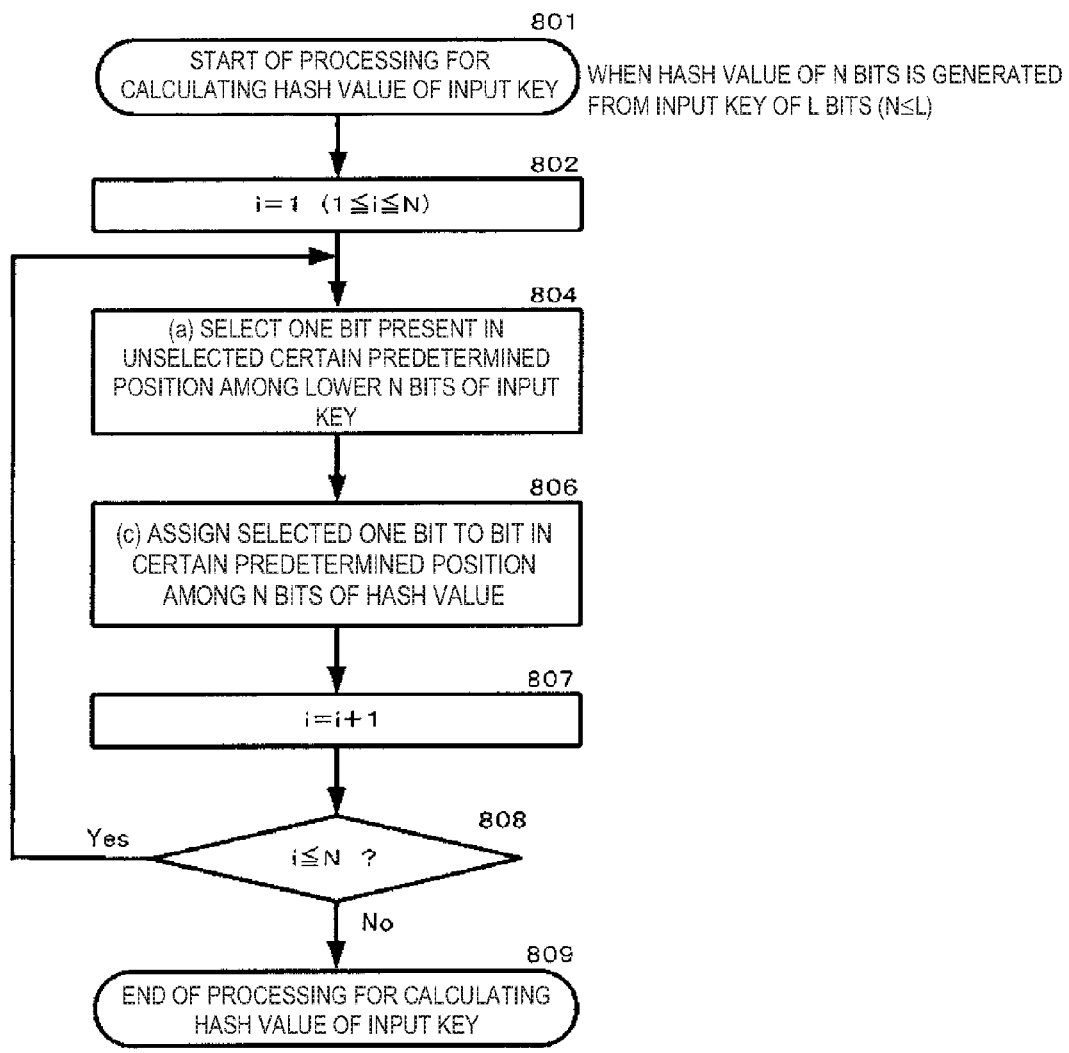

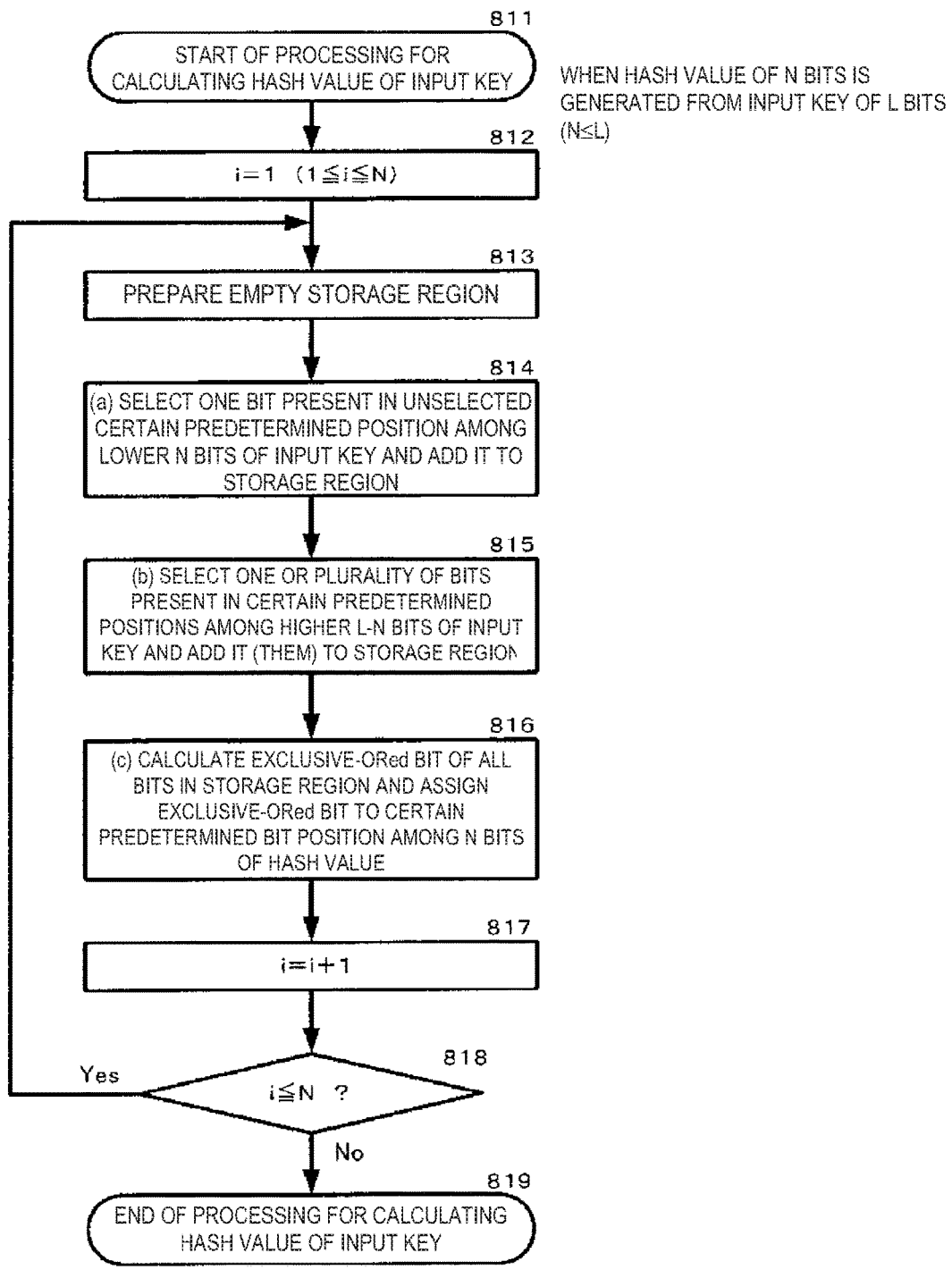

[Figure 9]
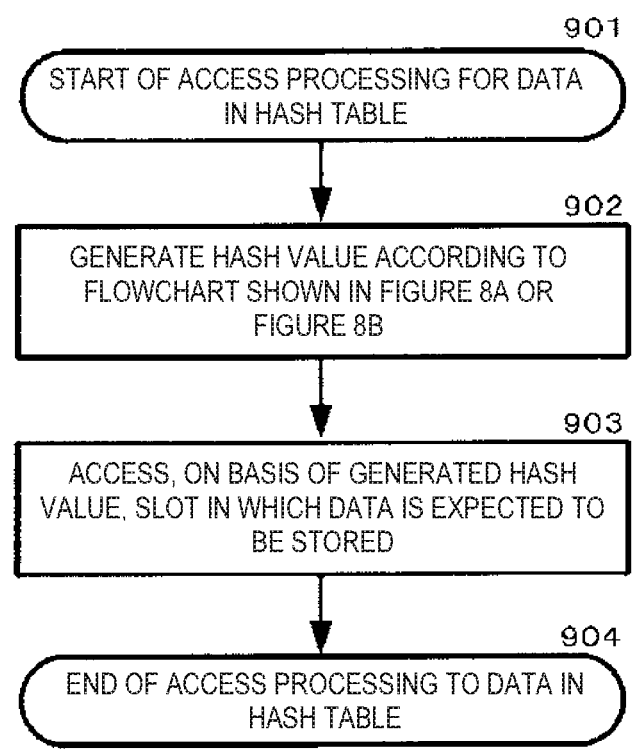

[Figure 10]
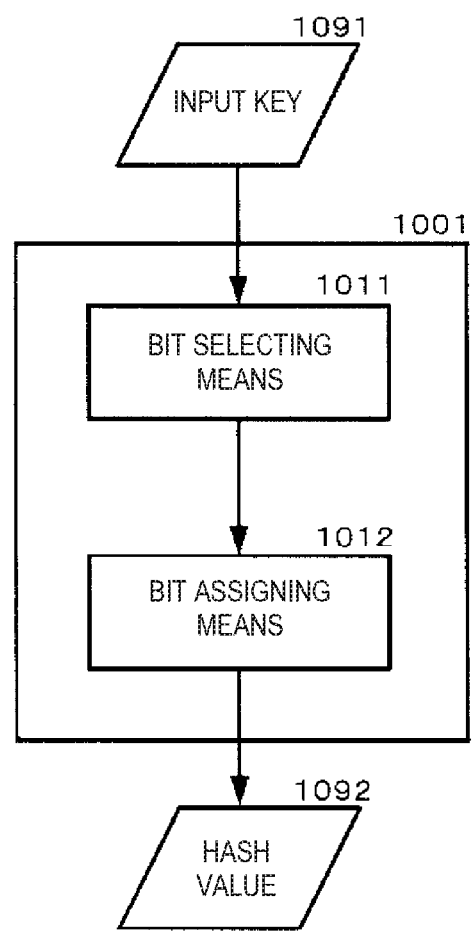

[Figure 11]
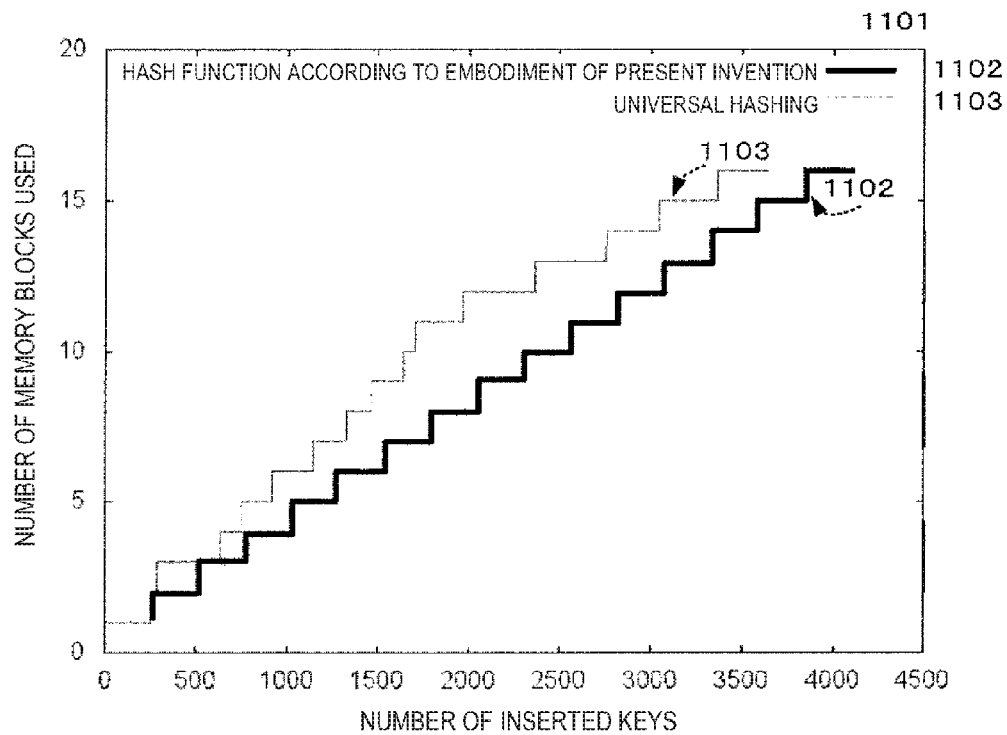
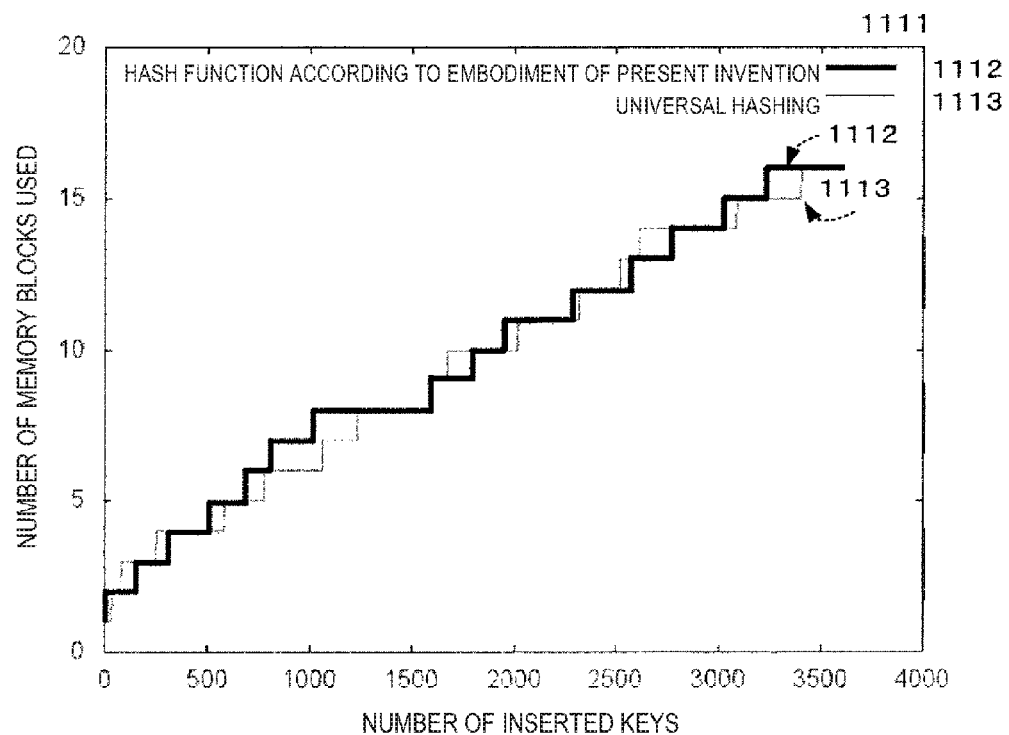

HASH VALUE CAPABLE OF GENERATING ONE OR MORE HASH FUNCTIONS

CROSS-REFERENCE TO RELATED APPLICATIONS

This application is based upon and claims priority from Japanese Patent Application Number 2014-257340, filed on Dec. 19, 2014, the entire disclosure of each application is incorporated by reference in its entirety.

BACKGROUND

The present invention generally relates to a technique for calculating a hash value and, more particularly, to a technique for calculating a hash value capable of generating one or more, in particular, a plurality of hash functions by changing a position for selecting a bit.

As a method of storing keys in a hash table with high space efficiency, there is known a method called multi-level hash table (MHT) that divides a hash table into multiple blocks by using different hash functions to improve the space efficiency (see Non Patent Literatures 1 and 2 described below).

Japanese Patent JP2004-229163A describes a fixed-length data retrieving device including: hash calculating means for calculating first and second hash values of input fixed-length data using two kinds of hash functions; a data table memory including N (N is an integer equal to or larger than 2) memory banks and storing a data table in which a large number of fixed-length data are retained; a pointer table memory storing a main memory pointer table in which memory addresses of storage destinations of the fixed-length data are retained using the first hash values as indexes and a sub-memory pointer table in which the memory addresses of the storage destinations of the fixed-length data are retained using the second hash values as indexes; and comparing means for simultaneously comparing a plurality of fixed-length data stored in the same memory addresses of the N memory banks and one fixed-length data input to the hash calculating means and outputting a comparison result.

Japanese patent JP08-235060A discloses that two tag memory addresses are simultaneously calculated by two different hash functions, first and second hash functions 64 and 66 respectively receive main memory addresses 60 as arguments and return values concerning tag memory addresses in a range of "0" to "n−1", and n is the number of cache entries; in the first hash function 64 and the second hash function 66, F1(v), which is the first hash function 64, returns a value i to any argument v, F2(v), which is the second hash function 66, returns a value j to any argument v, and i and j are selected to be always different concerning a given bit value; in this example, a bit 10 is selected as a bit different between the value i and the value j; and such a bit having a different value between i and j can be used as a control bit.

Japanese patent JP07-168841A describes a hash table generating method for changing a value of a coefficient used for a hash value calculation and calculating a coefficient having smallest deviation of a hash value to thereby generate a hash table with high retrieval efficiency and memory use efficiency.

SUMMARY

An FPGA (Field Programmable Gate Array) is a semiconductor device, the inside of which is programmable in a production line or a field of an apparatus rather than in a manufacturing processing of a semiconductor and in which a large number of logic gates are arrayed. If a hash table (also called "associative memory") can be built on the FPGA, the hash table can be used in high-throughput processing that makes use of a parallel computation ability of the FPGA.

However, the internal memory of the FPGA has a configuration in which a large number of small-capacity memory blocks are disposed. A method of realizing a hash table with high memory space efficiency using the subdivided memory mechanism is a problem. In the hash table, in general, a memory region not in use is generated by deviation of an input key. Even if it is attempted to use the deviation of the input key and a characteristic of a serial number key or a random key in order to effectively make use of the internal memory of the FPGA having the limited capacity, a characteristic of the input key is sometimes unknown beforehand. Even if the characteristic of the key is known, a change of a circuit of the FPGA is necessary in order to optimize memory use efficiency of the hash table according to the characteristic. In particular, the optimization during circuit operation is difficult.

As a method of storing keys in a hash table with high space efficiency, a method called multi-level hash table (MHT) is known. However, there are problems explained below in implementing the multi-level hash table in the FPGA:

(1) A different hash function is necessary for each of an enormous number of memory blocks typically exceeding one thousand; and
(2) It is desirable that a hash function can calculate a hash value within one clock for maximizing throughput. Therefore, it is necessary to avoid a complicated operation such as multiplication that requires multiple clocks to complete one calculation.

A framework called universal hashing for generating a large number of hash functions is known. However, hash functions generated by universal hashing framework typically use multiplication and remainder calculation that require multiple clocks to complete one calculation. FPGAs have digital signal processors (DSP) for accelerating multiplication and remainder calculation. However, a DSP cannot complete a multiplication or remainder calculation within one clock. Moreover, the number of DSPs that an FPGA has is considerably smaller than the number of memory blocks in the FPGA. Thus, if it uses the universal hashing framework, the FPGA cannot satisfy the request for completing a hash-value calculation within one clock.

In Japanese patent JP07-168841A, an approximate associative memory (hash table) is implemented on an FPGA. However, in Non Patent Literature 3, since an approximate data storing method is used, accurate data retrieval sometimes cannot be performed. Therefore, when accuracy is requested, the associative memory of Non Patent Literature 3 cannot be used.

As a hashing method, locality sensitive hashing (LSH) is known. In the LSH, the hash values of close data are mapped to close hash values. However, the LSH does not guarantee appearance of all patterns of hash values that can be output.

Therefore, it is an object of the present invention to solve the problems and provide a hash value calculating technique for, without limiting to an FPGA, making it possible to generate a hash function family (a collection of a plurality of generated hash functions) used for storing keys in a hash table with high space efficiency.

Another object of the present invention to provide a hash value calculating technique for making it possible to generate a hash function family used for storing keys in a hash table with high space efficiency.

The present invention provides a technique for calculating a hash value and provides a technique for making it possible to generate one or more hash functions by changing a predetermined position for selecting a bit. The technique can include a method of calculating the hash value, a computer for calculating the hash value, and a computer program and a computer program product of the computer.

In a first aspect according to the present invention, a method of calculating a hash value capable of generating one or more hash functions by changing a predetermined position for selecting a bit includes a computer performing calculation of generated certain one hash function by executing the steps of:

selecting one bit present in a certain predetermined position among lower N bits of an input key;

assigning the selected one bit to a bit in a certain predetermined position among N bits of the hash value; and repeating, until all bits of the hash value are assigned, the selecting step to select a bit not selected yet among the lower N bits of the key and the assigning step to assign the bit to a bit of the hash value.

The length of an input key is L bits, the length of a hash value is N bits, and N≤L.

In one embodiment of the present invention, the method can include the computer further executing a step of selecting one or a plurality of bits present in certain predetermined positions among higher L−N bits of the input key.

In this case, the step of assigning the bit can include a step of calculating an exclusive-ORed bit of the one bit selected in the step of selecting the one bit and of the one or the plurality of bits selected in the step of selecting the one or the plurality of bits, and assigning the exclusive-ORed bit to a bit in a certain predetermined position among the N bits of the hash value.

In this case, the repeating step can include a step of repeating, until all of the bits of the hash value are assigned, the step of selecting one bit not selected yet in the step of selecting among the lower N bits of the key, the step of selecting the one or the plurality of bits, and the step of assigning.

In one embodiment of the present invention, the step of selecting the one or the plurality of bits can include:

a step of selecting a plurality of bits from two or more different positions among the higher L−N bits of the input key when selecting the plurality of bits; or a step of selecting a plurality of bits all from different positions among the higher L−N bits of the input key when selecting the plurality of bits.

In one embodiment of the present invention, when the step of selecting the one or the plurality of bits is repeated in the repeating step, the step of selecting the one or the plurality of bits can include a step of selecting a bit in a position different from the positions selected among the higher L−N bits of the input key earlier in the repeating step.

In one embodiment of the present invention, when the step of selecting the one or the plurality of bits is repeated in the repeating step, the step of selecting the one or the plurality of bits can include a step of selecting the same number of bits as the number obtained by equally dividing L−N. The equally divided number is the number of bits selected when the step of selecting the one or the plurality of bits is executed first.

In one embodiment of the present invention, when (L−N) is divisible by N, the equally divided number is (L−N)/N.

In one embodiment of the present invention, when (L−N) is not divisible by N, the equally divided number is [(L−N)/N]+1 or [(L−N)/N]. [(L−N)/N] is the largest integer equal to or smaller than (L−N)/N.

In one embodiment of the present invention, the higher L−N bits of $2^N$ keys $\{2^N \times a, 2^N \times a+1, 2^N \times a+2, \ldots,$ and $2^N \times (a+1)-1\}$ can be the same (a is a non-negative integer).

In one embodiment of the present invention, the input keys can be random.

In one embodiment of the present invention, the step of selecting the one bit can include a step of selecting, on the basis of a predetermined random number sequence generated beforehand, one bit present in a certain predetermined position among lower N bits of the input key. In one embodiment of the present invention, the step of selecting the one or the plurality of bits can include a step of selecting, on the basis of a predetermined random number sequence generated beforehand, one or a plurality of bits present in certain predetermined positions among higher L−N bits of the input key.

In one embodiment of the present invention, in the assigning step, the step of calculating the exclusive-ORed bit can include a step of calculating h(k,r) that is the lower r-th bit of the hash value of an input key k by assigning the random number sequence to p of a function b(k,p) that returns the lower p-th bit of the input key k.

In one embodiment of the present invention, the method further includes the computer executing a step of preparing an empty storage region. In this case, the step of selecting the one bit can further include a step of adding, to the storage region, the one bit selected in the step of selecting the one bit. In this case, the step of selecting the one or the plurality of bits can further include a step of adding, to the storage region, the one or the plurality of bits selected in the step of selecting the one or the plurality of bits.

In one embodiment of the present invention, the step of selecting the one bit can be executed in parallel with the step of selecting the one or the plurality of bits, the step of selecting the one bit can be executed prior to the step of selecting the one or the plurality of bits, or the step of selecting the one or the plurality of bits can be executed prior to the step of selecting the one bit.

In one embodiment of the present invention, a hash function family consists of the plurality of hash functions generated by the method of the present invention can be used in universal hashing scheme or can be used in a multi-level hash table (MHT).

In one embodiment of the present invention, the method can include a step of a hash function generated by the method of the present invention outputting different $2^N$ hash values in response to the inputting different $2^N$ keys of which higher L−N bits are the same and of which lower N bits are different to cover all $2^N$ bit patterns.

In one embodiment of the present invention, the method can include the computer further executing:

a step of preparing a hash table; and a step of accessing data in the hash table on the basis of one of the generated hash functions or a plurality of the generated hash functions.

In one embodiment of the present invention, the computer can further execute a step of preparing a hash table in an FPGA by using the memory blocks of the FPGA.

In a second aspect according to the present invention, a computer for calculating a hash value makes it possible to generate one or more hash functions by changing a predetermined position for selecting a bit, the computer including, in order to perform calculation of generated certain one hash function bit selecting means for selecting one bit present in a certain predetermined position among lower N bits of an input key; and bit assigning means for assigning the selected one bit to a bit in a certain predetermined position among N bits of the hash value.

The computer can repeat, until all bits of the hash value are assigned, the bit selecting means selecting one bit present in a certain predetermined position among the bits not selected yet among lower N bits of the input key and the bit assigning means assigning the selected one bit to a bit in a certain predetermined position among N bits of the hash value. The length of an input key is L bits, the length of a hash value is N bits, and N≤L.

The bit selecting means can further select one or a plurality of bits present in certain predetermined positions among higher L−N bits of the input key.

The bit assigning means can calculate an exclusive-ORed bit of the one bit selected from the lower N bits of the key and of the one or the plurality of bits selected from the higher L−N bits of the key, and assign the exclusive-ORed bit to a bit in a certain predetermined position among the N bits of the hash value.

The computer can repeat, until all bits of the hash value are assigned, the bit selecting means selecting one bit present in a certain predetermined position among the bits not selected yet among lower N bits of the input key and selecting one or a plurality of bits present in certain predetermined positions among higher L−N bits of the input key and the bit assigning means calculating an exclusive-ORed bit of the one bit selected from the lower N bits of the key and of the one or the plurality of bits selected from the higher L−N bits of the key, and assigning the exclusive-ORed bit to a bit in a certain predetermined position among N bits of the hash value.

In one embodiment of the present invention, the bit selecting means can select a plurality of bits from two or more different positions among the higher L−N bits of the input key when selecting a plurality of bits among the higher L−N bits of the input key; or select a plurality of bits from all different positions among the higher L−N bits of the input key when selecting a plurality of bits among the higher L−N bits of the input key.

In one embodiment of the present invention, when repeating selecting one or a plurality of bits present in a certain predetermined position among higher L−N bits of the input key, the bit selecting means can select a bit in a position different from the positions selected among the higher L−N bits of the input key earlier in the repeating step.

In one embodiment of the present invention, when repeating selecting one or a plurality of bits present in a certain predetermined position among higher L−N bits of the input key, the bit selecting means can select the same number of bits as the number obtained by equally dividing L−N. The equally divided number is the number of bits selected when selecting one or a plurality of bits present in certain predetermined positions among the higher L−N bits of the input key is executed first.

In one embodiment of the present invention, when (L−N) is divisible by N, the equally divided number is be (L−N)/N.

In one embodiment of the present invention, when (L−N) is not divisible by N, the equally divided number is [(L−N)/N]+1 or [(L−N)/N]. [(L−N)/N] is the largest integer equal to or smaller than (L−N)/N.

In one embodiment of the present invention, the higher L−N bits of $2^N$ keys $\{2^N \times a, 2^N \times a+1, 2^N \times a+2, \ldots,$ and $2^N \times (a+1)-1\}$ can be the same (a is a non-negative integer).

In one embodiment of the present invention, the input keys can be random.

In one embodiment of the present invention, the bit selecting means can select, on the basis of a predetermined random number sequence generated beforehand, one bit present in a certain predetermined position among lower N bits of the input key. In one embodiment of the present invention, the bit selecting means can select, on the basis of a predetermined random number sequence generated beforehand, one or a plurality of bits present in certain predetermined positions among higher L−N bits of the input key.

In one embodiment of the present invention, the bit assigning means can calculate the exclusive-ORed bit by calculating h(k,r) that is the lower r-th bit of the hash value of an input key k by assigning the random number sequence to p of a function b(k,p) that returns the lower p-th bit of the input key k.

In one embodiment of the present invention, the bit selecting means can further prepare an empty storage region, add, to the storage region, the selected one bit present in a certain predetermined position among lower N bits of the input key, and add, to the storage region, selected one or a plurality of bits present in certain predetermined positions among higher L−N bits of the input key.

In one embodiment of the present invention, the bit selecting means can execute selecting one bit present in a certain predetermined position among lower N bits of the input key in parallel with selecting one or a plurality of bits present in certain predetermined positions among higher L−N bits of the input key, execute selecting one bit present in a certain predetermined position among lower N bits of the input key prior to selecting one or a plurality of bits present in certain predetermined positions among higher L−N bits of the input key, or execute selecting one or a plurality of bits present in certain predetermined positions among higher L−N bits of the input key prior to selecting one bit present in a certain predetermined position among lower N bits of the input key.

In one embodiment of the present invention, a hash function family consists of the plurality of hash functions generated by the method of the present invention can be used in universal hashing scheme or can be used in a multi-level hash table (MHT).

In one embodiment of the present invention, a hash function generated by the method of the present invention can output different $2^N$ hash values in response to the inputting different $2^N$ keys of which higher L−N bits are the same and of which lower N bits are different to cover all $2^N$ bit patterns.

In one embodiment of the present invention, the computer can prepare a hash table and access data in the hash table on the basis of one of the generated hash functions or a plurality of the generated hash functions.

In one embodiment of the present invention, the computer can prepare the hash table in an FPGA by using the memory blocks of the FPGA.

In a third aspect according to the present invention, a computer program and a computer program product cause the computer to execute the steps of the method in the first aspect according to the present invention in order to perform calculation of a generated certain one hash function.

The computer program according to an embodiment of the present invention can be stored in any computer-readable recording medium such as one or a plurality of flexible disks, MOs, CD-ROMs, DVDs, BDs, hard disk devices, memory media connectable to a USB, ROMs, MRAMs, and RAMs. For the storage in the recording media, the computer program can be downloaded from another data processing system, for example, a computer connected by a communication line, or copied from another recording medium. The computer program according to the embodiment of the present invention can also be compressed or divided into a plurality of computer programs and stored in a single or a plurality of recording media. Please note that it is also naturally possible to provide a computer program product according to the embodiment of the present invention in various forms. The computer program product according to the embodiment of the present invention can include, for example, a storage medium having the computer program recorded therein or a transmission medium for transmitting the computer program.

The overview of the present invention explained above does not enumerate all necessary features of the present invention. It should be noted that combinations or sub-combinations of these constituent elements can also be the present invention.

It goes without saying that those skilled in the art could easily assume various changes such as combining hardware components of the computer used in the embodiment of the present invention with a plurality of machines and distributing functions to the machines and implementing the functions. Those changes are concepts naturally included in the idea of the present invention. However, these constituent elements are illustrations and not all the constituent elements are essential constituent elements of the present invention.

The present invention can be realized as hardware, software, or a combination of the hardware and the software. Typical examples of execution by the combination of the hardware and the software include execution of the computer program in a computer installed with the computer program. In such a case, the computer program is loaded to a memory of the computer and executed, whereby the computer program controls the computer to execute processing according to the present invention. The computer program can be configured from a command group that can be expressed by any language, code, or notation. Such a command group enables the computer to execute a specific function directly or after one or both of 1. conversion into another language, code, or notation and 2. copying to another media are performed.

According to the embodiment of the present invention, a hash function generated in the embodiment of the present invention, when the length of a key is L bits and the length of a hash value is N bits, has a characteristic of outputting different $2^N$ hash values in response to the inputting different $2^N$ keys of which higher L−N bits are the same and of which lower N bits are different to cover all $2^N$ bit patterns. It is possible to generate a large number of hash functions that satisfy the characteristic by changing the bit selection for calculating exclusive ORs.

When a hash function family generated according to the embodiment of the present invention is used in a multi-level hash table (MHT), the efficiency of memory block usage is 100% when continuous keys beginning from $2^N \times a$ are inserted where a is a non-negative integer. That is, when the MHT overflows, all memory slots are filled because each hash function can output all $2^N$ hash values. This makes it possible to prevent a memory space from being wasted.

When input keys are continuous, the hash function family generated according to the embodiment of the present invention exhibits performance far better than the conventional hash function. When input keys are random, the hash function family exhibits performance equivalent to the conventional hash function.

According to the embodiment of the present invention, for example, in the case of an FPGA or dedicated hardware, it is possible to complete the calculation of a hash value within one clock.

According to the embodiment of the present invention, when the characteristic that all $2^N$ hash values appear is used, the hash values can be used for a reset of a memory block. For example, while $2^N$ keys that have the same higher L−N bits and that cover all bit patterns of the lower N bits are input to a hash function of the present invention, if each output hash value is used as an address of the memory block and, at the same time, zero is input as data, it is possible to realize zero-clear of all $2^N$ slots of the memory block. In the case of the existing hash functions, since all of the hash values do not always appear, the hash values cannot be directly used as memory addresses for performing a reset. In this case, dedicated circuit for performing a reset is necessary. By using the hash values according to the embodiment of the present invention for a reset of a memory block, it is possible to simplify the circuit for the reset of the memory block.

The hash function families generated according to the embodiment of the present invention can be used in MHT.

The hash function family generated according to the embodiment of the present invention can be used for the purpose of universal hashing.

BRIEF DESCRIPTION OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 3B is a diagram in which a hash function generated according to the embodiment of the present invention outputs hash values (likely to cause collisions) when random keys are input;

FIG. 8A is a flowchart of processing for generating one of the hash values according to the embodiment of the present invention;

FIG. 8B is a flowchart of the processing for generating one of the hash values according to the embodiment of the present invention;

FIG. 9 is a diagram in which data in a hash table is accessed on the basis of a hash function or a plurality of hash functions generated according to the embodiment of the present invention;

FIG. 10 is a diagram showing an example of a functional block diagram of a computer that preferably includes a hardware configuration according to FIG. 1A or FIG. 1B and carries out the embodiment of the present invention according to the flowcharts respectively shown in FIG. 8A and FIG. 8B; and FIG. 11 shows changes in the number of memory blocks used when the generated hash memory family was used in the multi-level hash table (MHT) according to the embodiment of the present invention.

DETAILED DESCRIPTION

Figure 1A:
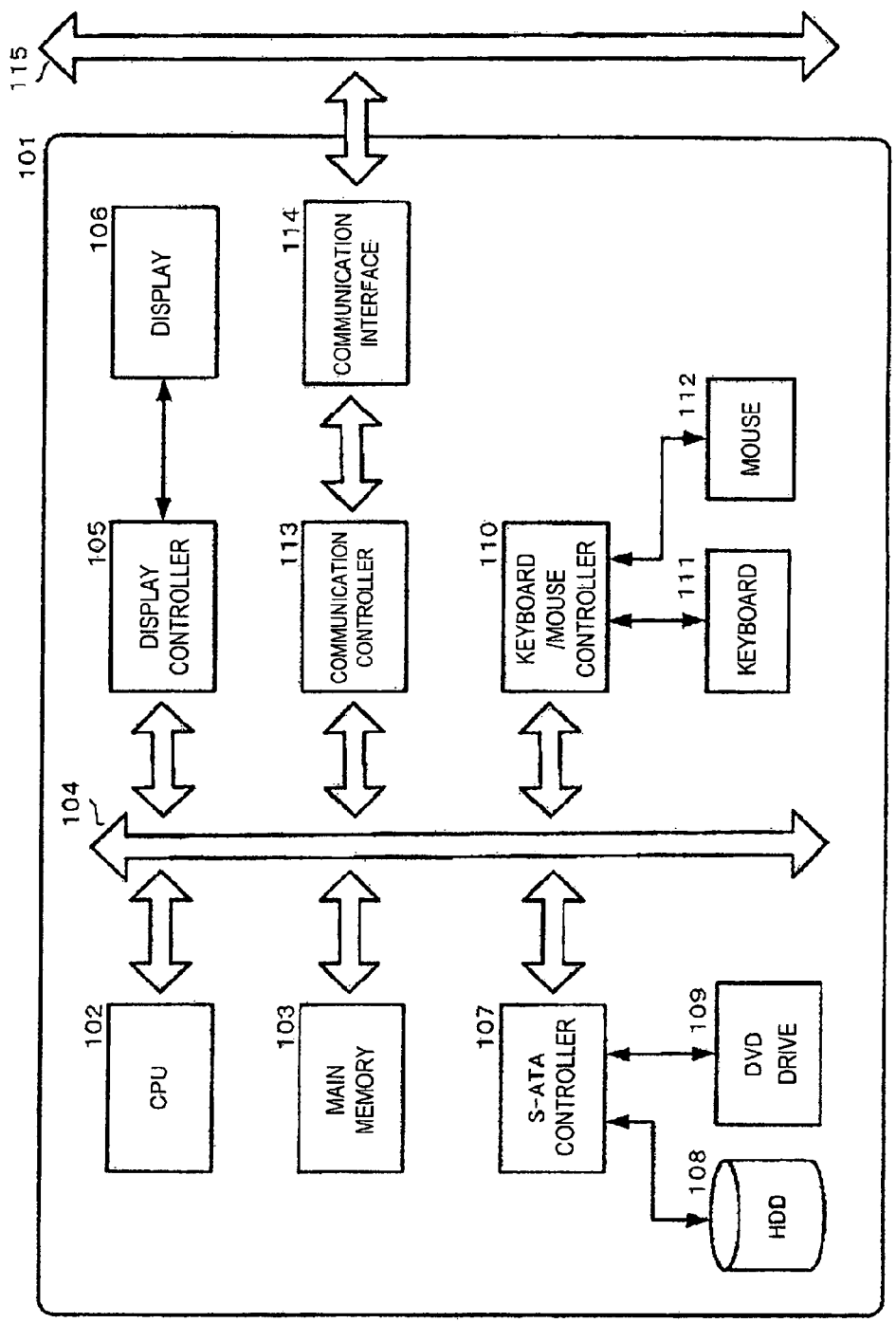
FIG. 1A is a diagram showing an example of a computer that can be used in an embodiment of the present invention or a computer according to the embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The terminology used herein is for the purpose of describing particular embodiments only and is not intended to be limiting of the invention.

An embodiment of the present invention is explained below with reference to the drawings. Throughout the drawings referred to below, the same reference numerals and signs denote the same targets unless specifically noted otherwise. Please understand that the embodiment of the present invention is an embodiment for explaining a preferred mode of the present invention and is not intended to limit the scope of the present invention to the scope explained in the embodiment.

FIG. 1A is a diagram showing an example of a computer that can be used in the embodiment of the present invention or a computer according to the embodiment of the present invention. The computer can be, for example, one or a plurality of computers, for example, server computers (e.g., computers including a server function) but is not limited to these computers.

A computer (101) includes one or a plurality of CPUs (102) and a main memory (103). The CPU (102) and the main memory (103) are connected to a bus (104). The CPU (102) is based on a 32-bit or 64-bit architecture, for example. The CPU (102) can be, for example, a Power™ series of International Business Machines Corporation, Xeon® series, Core™ i series, Core™ 2 series, Pantium® series, Celeron® series, or Atom™ series of Intel Corporation, or Opteron™ series, A series, Phenom™ series, Athlon™ series, Turion® series, or Sempron™ of AMD (Advanced Micro Devices), Inc.

A display (106), for example, a liquid crystal display (LCD) can be connected to the bus (104) via a display controller (105). The liquid crystal display (LCD) may be, for example, a touch panel display or a floating touch display. The display (106) can be used for displaying, on an appropriate graphic interface, an object displayed by operation of software (e.g., a computer program according to the embodiment of the present invention or any various computer programs operating on the computer (101)) operating on the computer (101). The display (106) can output, for example, a screen of a web browser application.

A disk (108), for example, a hard disk or a solid state drive (SSD) can be optionally connected to the bus (104) via, for example, a SATA or an IDE controller (107).

A drive (109), for example, a CD, a DVD, or a BD drive can be optionally connected to the bus (104) via, for example, the SATA or the IDE controller (107).

A keyboard (111) and a mouse (112) can be optionally connected to the bus (104) via a peripheral device controller (110), for example, via a keyboard/mouse controller or a USB bus.

In the disk (108), an operating system, for example, an operating system developed for a mainframe (e.g., z/OS, z/VM, or z/VSE), Windows®, UNIX®, Linux®, MacOS®, and Android®, a Java® processing environment such as J2EE, a Java® application, a Java® virtual machine (VM), a program for providing a Java® Just In Time (JIT) compiler, a computer program according to the embodiment of the present invention, any other various computer programs, and data can be stored to be loadable to the main memory (103).

In the disk (108), software for enabling processing for generating a hash function family according to the embodiment of the present invention is stored to be loadable to the main memory (103).

The disk (108) may be incorporated in the computer (101), may be connected via a cable to enable the computer (101) to access the disk (108), or may be connected via a wired or wireless network to enable the computer (101) to access the disk (108).

The drive (109) is used according to necessity in order to install a program, for example, an operating system, application programs, or the computer program according to the embodiment of the present invention in the disk (108) from a CD-ROM, a DVD-ROM, or a BD.

A communication interface (114) conforms to, for example, an Ethernet® protocol. The communication interface (114) is connected to the bus (104) via a communication controller (113), plays a role of connecting the computer (101) to a communication line (115) by wire or radio, and provides a network interface layer to a TCP/IP communication protocol of a communication function of an operating system of the computer (101). Note that the communication line can be, for example, a wireless LAN environment based on a wireless LAN connection standard, a Wi-Fi wireless LAN environment such as IEEE802.11a/b/g/n, or a cellular phone network environment (e.g., a 3G, LTE, or 4G environment).

Figure 1B:
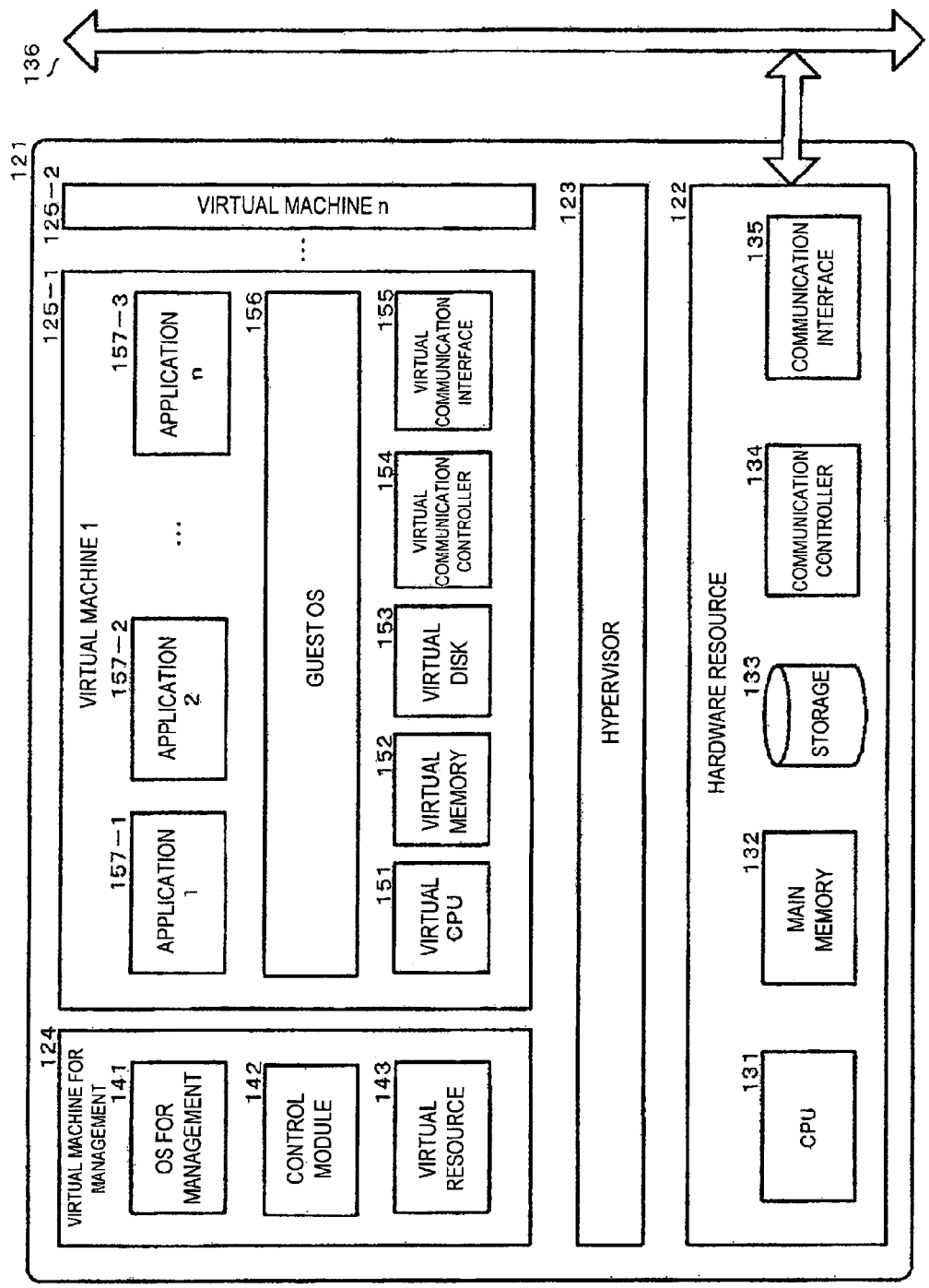
FIG. 1B is a diagram showing an example of a computer that can be used in the embodiment of the present invention or a computer according to the embodiment of the present invention in the case in which one or a plurality of virtual machines are operated on the computer.

FIG. 1B is a diagram showing an example of a computer that can be used in the embodiment of the present invention or a computer according to the embodiment of the present invention in the case in which one or a plurality of virtual machines are operated on the computer. The computer can be configured as, for example, a server computer such as a work station, a rack mount type server, a blade type server, a midrange, or a mainframe.

A computer (121) shown in FIG. 1B can include one or a plurality of CPUs (131), a main memory (132), a storage (133), a communication controller (134), and a communication interface (135) as hardware resources (122). The one or the plurality of CPUs (131), the main memory (132), the storage (133), the communication controller (134), and the communication interface (135) and a communication line (136) can respectively correspond to the one or the plurality of CPUs (102), the main memory (103), the disk (108), the communication controller (113), and the communication interface (114) of the computer (101) and the communication line (115) shown in FIG. 1A.

The computer (121) can operate as a physical host machine and operate one or a plurality of virtual machines 1 to n (125-1 to 125-2) (also called domain Us or child partitions) including the same or different OSs (e.g., Windows®, UNIX®, and Linux®) as guest OSs (156) on a hypervisor (also called virtualized monitor or virtualized OS) of virtualized software (e.g., VMWare®, Hyper-V®, or Xen®).

The computer (121) can operate a virtual machine for management (124) (also called domain 0 or parent partition) on the hypervisor. The virtual machine for management (124) includes an OS for management (141), a control module (142) operating on the OS for management (141), and a virtual resource (143). The control module (142) is a module that issues a command to a hypervisor (123). The control module (142) issues commands for creation of the virtual machines 1 to n (125-1 to 125-2) of a user domain and start of the guest OSs (156) to the hypervisor (123) and controls the operation of the virtual machines 1 to n (125-1 to 125-2). The virtual resource (143) is the hardware resource (122) assigned to the virtual machine for management (124).

The virtual machines 1 to n (125-1 to 125-2) include virtual resources, the guest OSs (156), and various applications 1 to n (157-1 to 157-3) operating on the guest OSs (156). The virtual resources include, for example, a virtual CPU (151), a virtual memory (152), a virtual disk (153), a virtual communication controller (154), and a virtual communication interface (155).

FIG. 2A to FIG. 2G respectively are diagrams in which a hash value is generated using a hash function, that is, a diagram in which a bit is selected from a predetermined position and a hash value is generated according to the embodiment of the present invention. Note that, in the following explanation, the description of the computer (101) (see FIG. 1A) can read the computer (121) (see FIG. 1B).

Figure 2A:
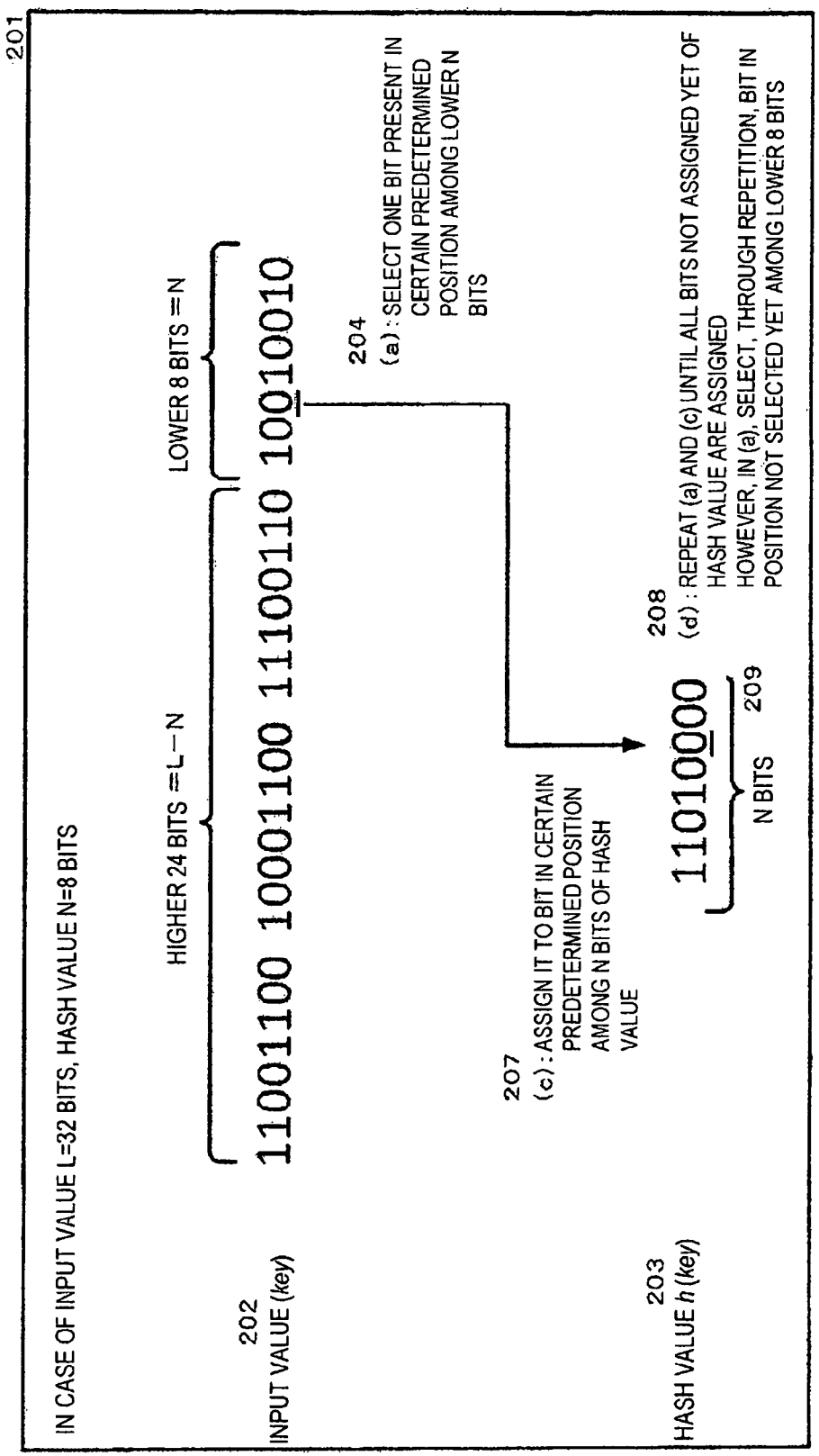
FIG. 2A is a diagram in which a bit is selected from a predetermined position and a hash value is generated according to the embodiment of the present invention.

FIG. 2A is an illustration of an embodiment of an invention according to claim 1. A diagram (201) is shown in which, when the length of an input value (key) is 32 bits (L=32) and the length of a hash value h(key) is 8 bits (N=8), a bit is selected from a predetermined position and a hash value is generated. The computer (101) determines beforehand, for example, using a random number sequence, how a bit is selected in step (a) explained below (concerning an example in which the random number sequence is used, refer to FIG. 4 below).

In order to generate an 8-bit hash value (203), the computer (101) uses lower 8 bits (N) (the same as the number of bits of the hash value) of an input value (202).

The computer (101) selects one bit present in a certain predetermined position among the lower 8 bits of the key (step (a): 204). FIG. 2A indicates that a sixth bit (0) among the lower 8 bits (a first bit to an eighth bit) of the key is selected.

The computer (101) assigns the selected one bit (0) to a bit in a certain predetermined position among the 8 bits of the hash value (203) (step (c): 207). FIG. 2A indicates that the selected one bit (0) is stored in a third bit among the 8 bits (a first bit to an eighth bit) of the hash value (see 209).

The computer (101) repeats steps (a) and (c) until all the remaining 7 bits of the hash value (203) are assigned (step (d): 208). However, in step (a), a bit once selected among the lower 8 bits is not selected in the subsequent repeated steps.

The hash value (209) indicates a hash value generated after steps (a) and (c) are repeated until all the remaining 7 bits of the hash value (203) are assigned.

Figure 2B:
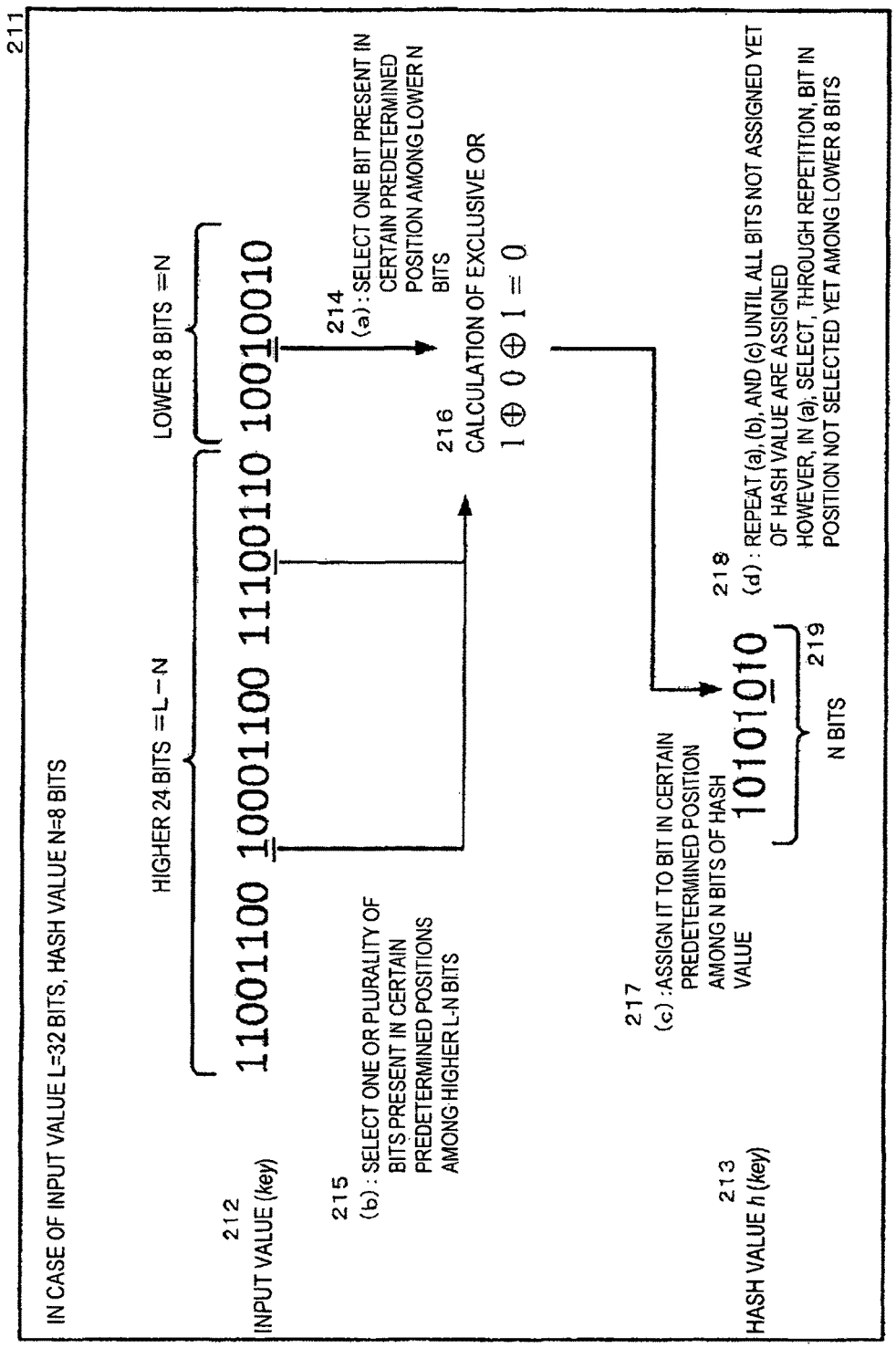
FIG. 2B is a diagram in which bits are selected from predetermined positions and a hash value is generated according to the embodiment of the present invention.

FIG. 2B is an illustration of an embodiment of an invention according to claim 2. A diagram (211) is shown in which, when the length of an input value (key) is 32 bits (L=32) and the length of a hash value h(key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below).

In order to generate an 8-bit hash value (213), the computer (101) uses lower 8 bits (N) (the same as the number of bits of the hash value) of an input value (212) and higher 24 bits (L−N).

The computer (101) selects one bit present in a certain predetermined position among the lower 8 bits (N) (step (a): 214). FIG. 2B indicates that a fifth bit (1) among the lower 8 bits (a first bit to an eighth bit) is selected.

The computer (101) selects one or a plurality of bits among higher 24 bits (L−N) in parallel with step (a) or before or after step (a) (step (b): 215). When selecting one or a plurality of bits present in certain predetermined positions among the higher 24 bits (L−N) (step (b): 215), the computer (101) may select a bit present in the same position among the higher 24 bits (L−N) a plurality of times. FIG. 2B indicates that two bits, i.e., a sixteenth bit (1) and a fifth bit (0) among the higher 24 bits (a first bit to a twenty-fourth bit) are selected.

The computer (101) calculates the exclusive OR of the bits of the bits 1 and 0 selected in step 215 and of the bit 1 selected in step 214 and gets the calculated value 0 (step 216).

The computer (101) assigns the calculated value 0 calculated in step 216 to a bit in a certain predetermined position among the 8 bits of the hash value (213) (step (c): 217). FIG. 2B indicates that the calculated value (0) is stored in a third bit among the 8 bits (a first bit to an eighth bit) of the hash value (see 219).

The computer (101) repeats steps (a), (b), and (c) until all the remaining 7 bits of the hash value (213) are assigned (step (d): 218). However, in step (a), a bit once selected among the lower 8 bits (N) is not selected in the subsequent repeated steps. In repeated step (b), when selecting one or a plurality of bits present in certain predetermined positions among the higher 24 bits (L−N) through the repetition, the computer (101) can select a bit present in a position the same as a position once selected in the past (a position selected in preceding step (b)) and select a bit present in a position different from the position once selected in the past (i.e., a bit present in a position not selected yet).

The hash value (219) indicates a hash value generated after steps (a), (b), and (c) are repeated until all the remaining 7 bits of the hash value (213) are assigned.

Figure 2C:
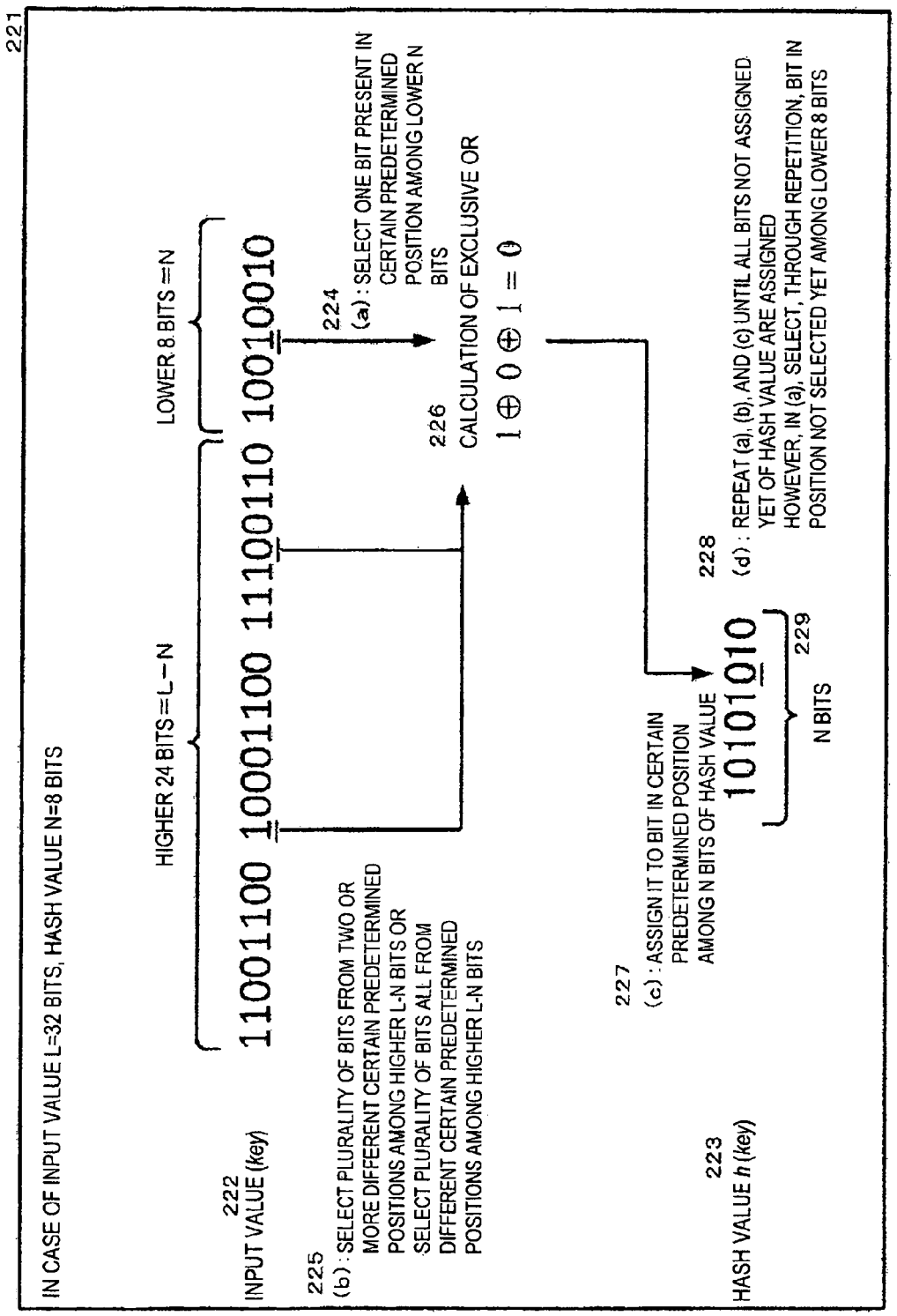
FIG. 2C is a diagram in which a bits are selected from predetermined positions and a hash value is generated according to the embodiment of the present invention.

FIG. 2C is an illustration of an embodiment of an invention according to claim 3. A diagram (221) is shown in which, when the length of an input value (key) is 32 bits (L=32) and the length of a hash value h(key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below).

FIG. 2C is the same as FIG. 2B except points explained below (reference numerals 221 to 229 shown in FIG. 2C respectively correspond to reference numerals 211 to 219 shown in FIG. 2B).

In step (b), when selecting a plurality of bits among higher 24 bits (L−N) (step (b): 225), the computer (101) can select a plurality of bits from two or more different positions of the higher 24 bits (L−N) or select a plurality of bits all from different positions among the higher 24 bits (L−N). When selecting the plurality of bits from the two or more different positions, the computer (101) is allowed to select a bit present in the same position a plurality of times. Note that, when the plurality of bits among the higher 24 bits (L−N) are selected (step (b): 225), uniform distribution performance of a hash function can be higher and, for example, space efficiency can be higher in storing a key in a hash table when the plurality of bits are all selected from the different positions among the higher 24 bits (L−N) than that when the bit present in the same position among the higher 24 bits (L−N) is selected a plurality of times.

Figure 2D:
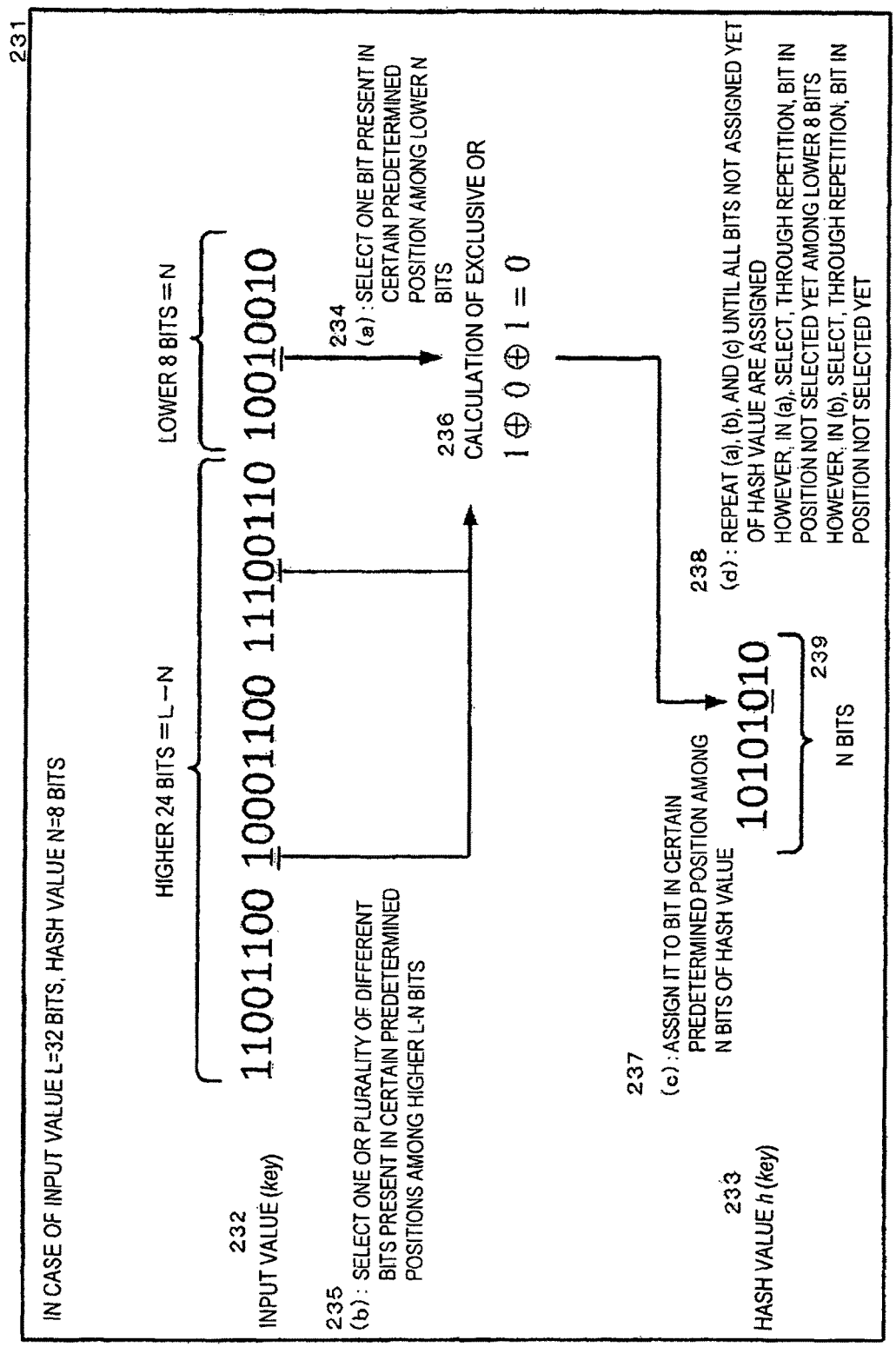
FIG. 2D is a diagram in which bits are selected from predetermined positions and a hash value is generated according to the embodiment of the present invention.

FIG. 2D is an illustration of an embodiment of an invention according to claim 4. A diagram (231) is shown in which, when the length of an input value (key) is 32 bits (L=32) and the length of a hash value h (key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below).

FIG. 2D is the same as FIG. 2C except points explained below (reference numerals 231 to 239 shown in FIG. 2D respectively correspond to reference numerals 221 to 229 shown in FIG. 2C).

In step (d), when repeating steps (a), (b), and (c) until all the remaining 7 bits of the hash value (233) are assigned (step (d): 238), the computer (101) selects a bit present in a position different from a position once selected in the past (a position selected in preceding step (b)) (i.e., a bit present in a position not selected yet) through the repetition of step (b). Note that, when repeating steps (a), (b), and (c) until all the remaining 7 bits of the hash value (233) are assigned (step (d): 238), uniform distribution performance of a hash function can be higher and, for example, space efficiency can be higher in storing a key in a hash table when the bit present in the position different from the position once selected in the past is selected than that when the bit present in the position once selected in the past is selected.

Figure 2E:
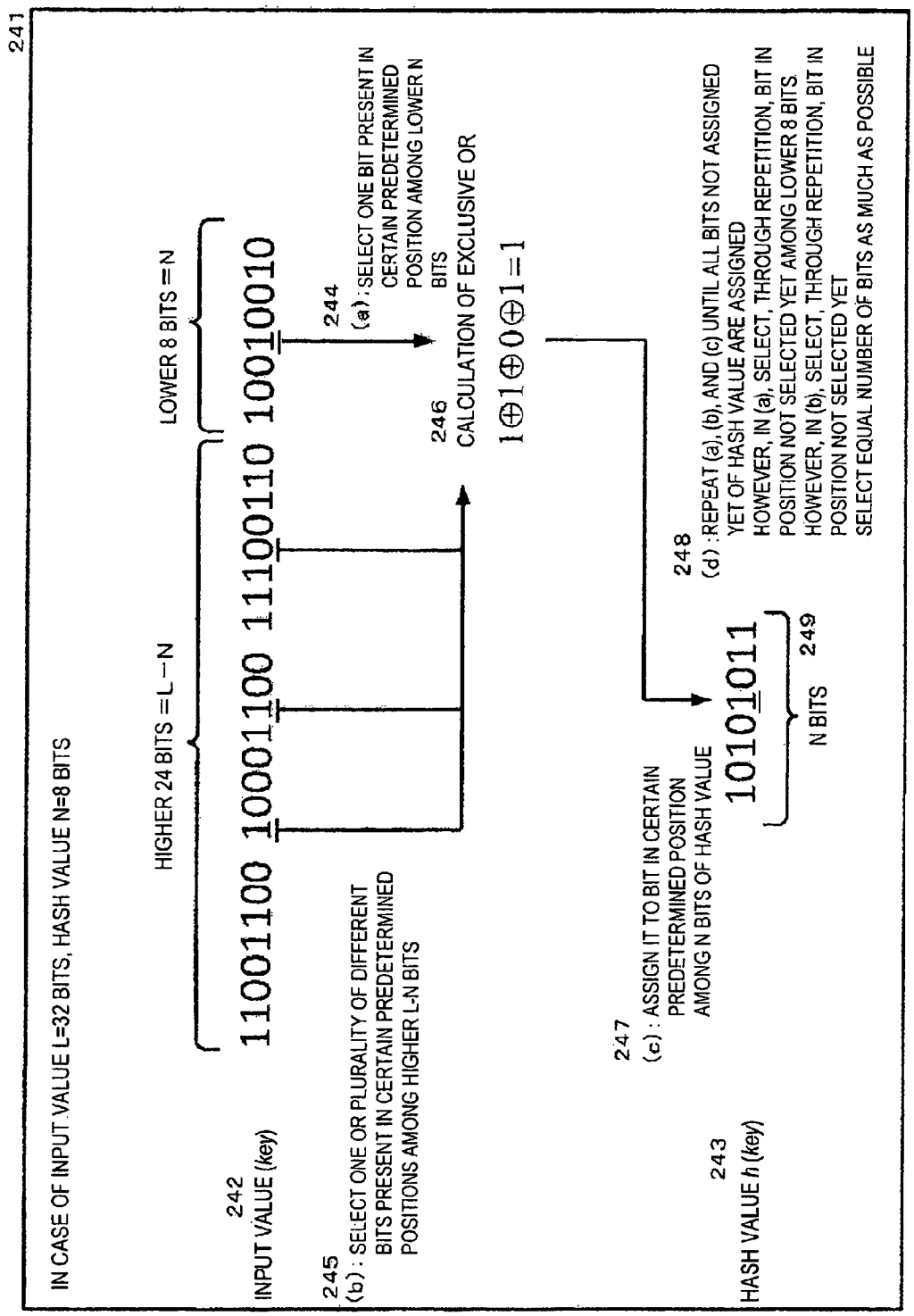
FIG. 2E is a diagram in which bits are selected from predetermined positions and a hash value is generated according to the embodiment of the present invention.

FIG. 2E is an illustration of an embodiment of an invention according to claim 5. A diagram (241) is shown in which, when the length of an input value (key) is 32 bits (L=32) and the length of a hash value h (key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below)

In order to generate an 8-bit hash value (243), the computer (101) uses lower 8 bits (N) (the same as the number of bits of the hash value) of an input value (242).

The computer (101) selects one bit present in a certain predetermined position among the lower 8 bits (step (a): 244). FIG. 2E indicates that a fifth bit (1) among the lower 8 bits (a first bit to an eighth bit) of the key is selected.

The computer (101) selects one or a plurality of different bits present in certain predetermined positions among higher 24 bits (L−N) in parallel with step (a) or before or after step (a) (step (b): 245). FIG. 2E indicates that three bits, i.e., a sixteenth bit (1), an eleventh bit (1), and a fifth bit (0) among the higher 24 bits (a first bit to a twenty-fourth bit) are selected.

The computer (101) calculates exclusive OR of the bits 1, 1, and 0 selected in step 245 and of the bit 1 selected in step 244 and get the calculated value 1 (step 246).

The computer (101) assigns the calculated value 1 calculated in step 246 to a bit in a certain predetermined position among the 8 bits of the hash value (243) (step (c): 247). FIG. 2E indicates that the calculated value (1) is stored in a fourth bit among the 8 bits (a first bit to an eighth bit) of the hash value (see 249).

The computer (101) repeats steps (a), (b), and (c) until all the remaining 7 bits of the hash value (243) are assigned (step (d): 248). However, in step (a), a bit once selected among the lower 8 bits is not selected in the subsequent repeated steps. In repeated step (d), when repeating steps (a), (b), and (c) until all the remaining 7 bits of the hash value (243) are assigned (step (d): 248), the computer (101) selects a bit present in a position different from a position once selected in the past (a position selected in preceding step (b)) (i.e., a bit present in a position not selected yet) through the repetition of step (b).

When selecting the bit present in the position different from the position once selected in the past (the position selected in preceding step (b)), the computer (101) selects, as much as possible, the same number of bits from the higher L−N bits as the number obtained by equally dividing L−N. When (L−N) is divisible by N, the equally divided number can be (L−N)/N. When (L−N) is not divisible by N, the equally divided number can be [(L−N)/N]+1 or [(L−N)/N]. [(L−N)/N] can be the largest integer equal to or smaller than (L−N)/N.

Figure 2F:
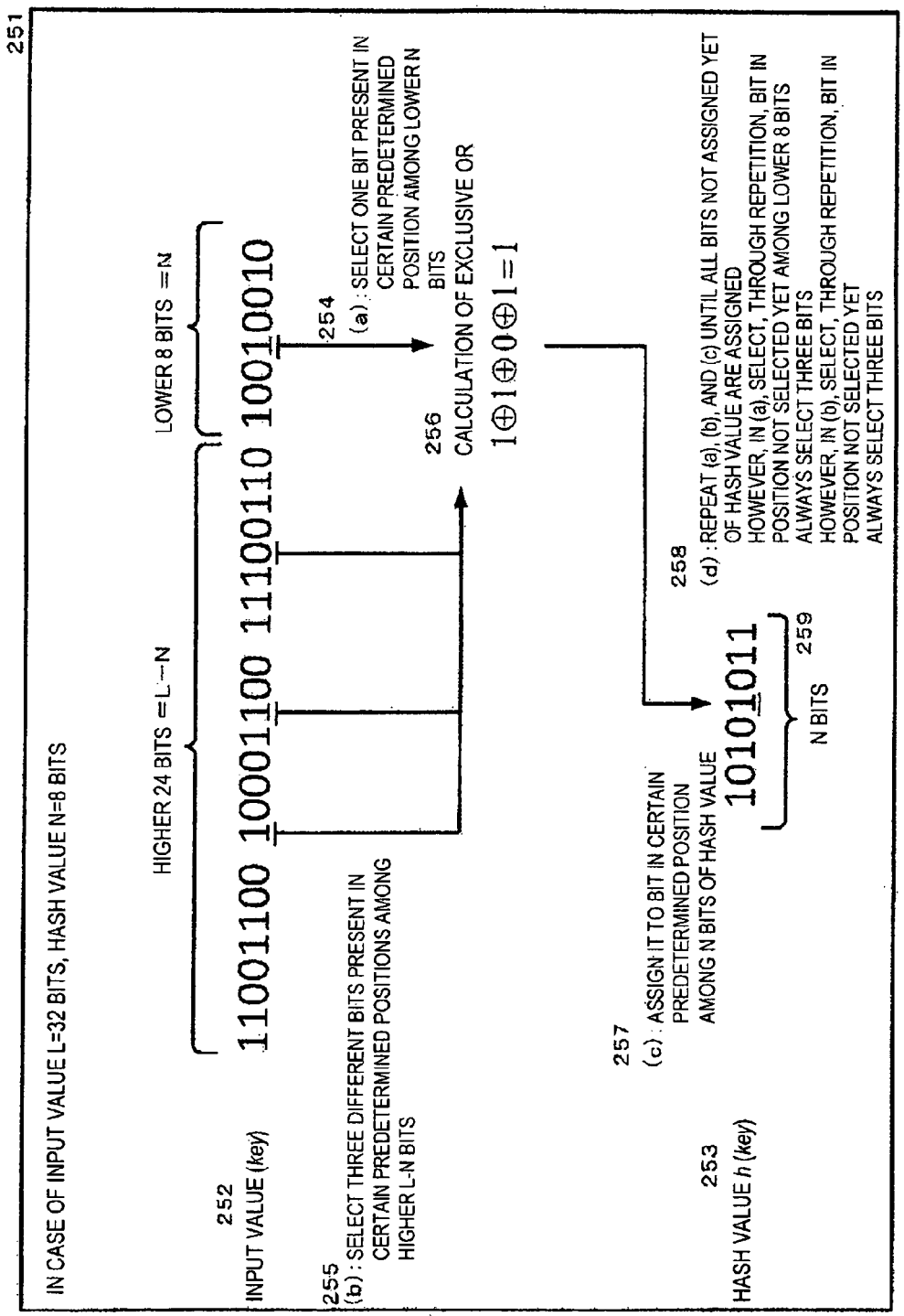
FIG. 2F is a diagram in which bits are selected from predetermined positions and a hash value is generated according to the embodiment of the present invention.

FIG. 2F is an illustration of an embodiment of an invention according to claim 6. A diagram (251) is shown in which, when the length of an input value (key) is 32 bits (L=32) and the length of a hash value h(key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below).

FIG. 2F is the same as FIG. 2E except points explained below (reference numerals 251 to 259 shown in FIG. 2F respectively correspond to reference numerals 241 to 249 shown in FIG. 2E).

In step (d), when selecting a bit present in a position different from a position once selected in the past (a position selected in preceding step (b)), the computer (101) selects the same number of bits from the higher L−N bits as the number obtained by equally dividing L−N. When (L−N) is divisible by N, the equally divided number is (L−N)/N. In FIG. 2F, since (L−N)=24 is divisible by N=8, the equally divided number is 3.

Figure 2G:
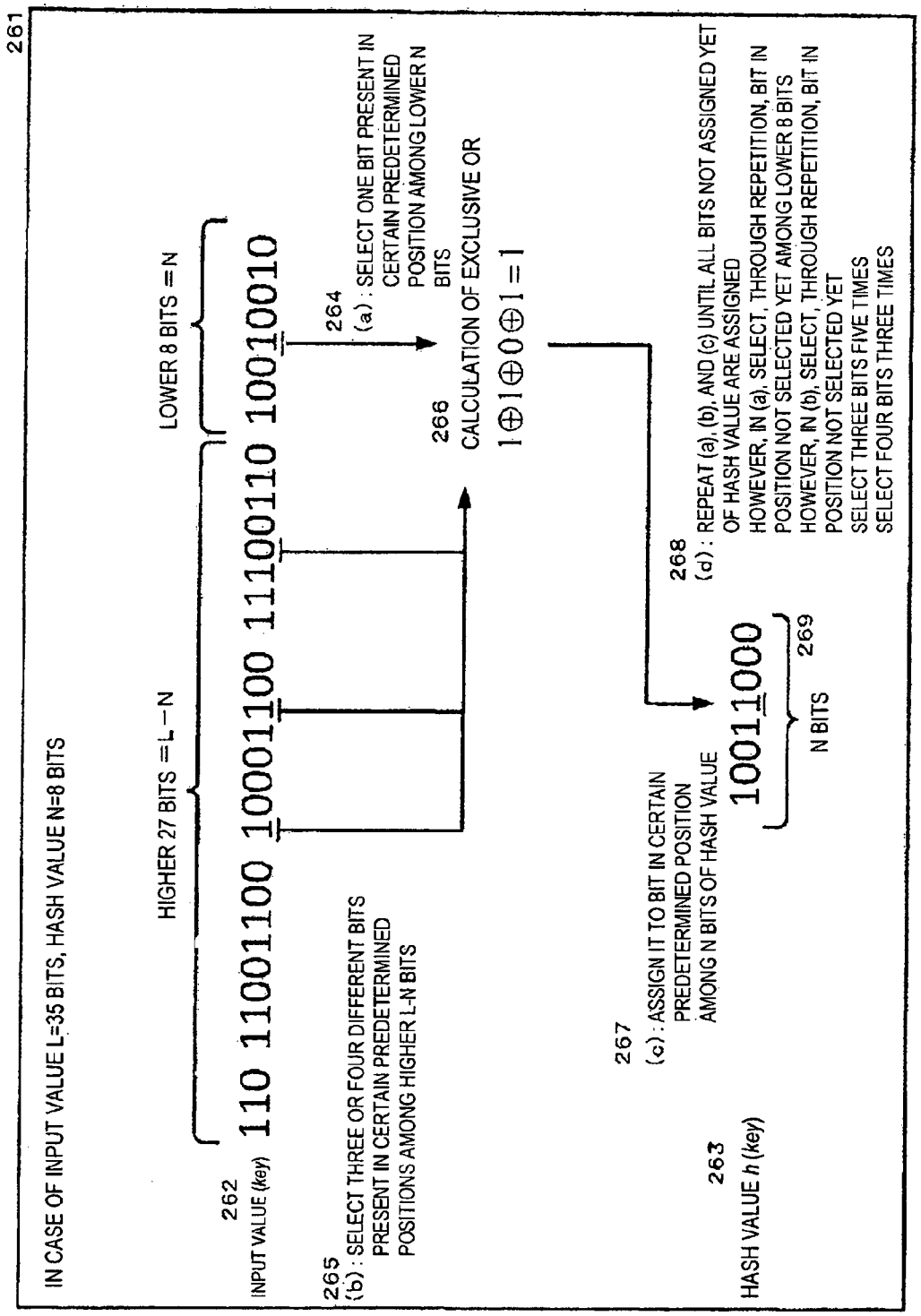
FIG. 2G is a diagram in which bits are selected from predetermined positions and a hash value is generated according to the embodiment of the present invention.

FIG. 2G is an illustration of an embodiment of an invention according to claim 7. A diagram (261) is shown in which, when the length of an input value (key) is 35 bits (L=35) and the length of a hash value h (key) is 8 bits (N=8), a bit is selected from a predetermined position and a hash value is generated. The computer (101) determines beforehand, for example, using a random number sequence, how a bit is selected in step (a) and step (b) explained below (concerning an example in which the random number sequence is used, refer to a random number sequence shown in FIG. 4 below).

In order to generate an 8-bit hash value (263), the computer (101) uses lower 8 bits (N) of an input value (262).

The computer (101) selects one bit present in a certain predetermined position among the lower 8 bits (step (a): 264). FIG. 2G indicates that a fifth bit (1) among the lower 8 bits (a first bit to an eighth bit) of the key is selected.

The computer (101) selects bits present in one or a plurality of different positions present in certain predetermined positions among higher 27 bits (L−N) in parallel with step (a) or before or after step (a) (step (b): 265). FIG. 2G indicates that three bits, i.e., a sixteenth bit (1), an eleventh bit (1), and a fifth bit (0) among the higher 27 bits (a first bit to a twenty-seventh bit) are selected.

The computer (101) calculates the exclusive OR of the bits 1, 1, and 0 selected in step 265 and of the bit 1 selected in step 264 and gets the calculated value 1 (step 266).

The computer (101) assigns the calculated value 1 calculated in step 266 to a bit in a certain predetermined position among the 8 bits of the hash value (263) (step (c): 267). FIG. 2G indicates that the calculated value (1) is stored in a fourth bit among the 8 bits (a first bit to an eighth bit) of the hash value (see 269).

The computer (101) repeats steps (a), (b), and (c) until all the remaining 7 bits of the hash value (263) are assigned (step (d): 268). However, in step (a), a bit once selected among the lower 8 bits is not selected in the subsequent repeated steps. In repeated step (d), when repeating steps (a), (b), and (c) until all the remaining 7 bits of the hash value (263) are assigned (step (d): 268), the computer (101) selects a bit present in a position different from a position once selected in the past (a position selected in preceding step (b)) (i.e., a bit present in a position not selected yet) through the repetition of step (b). When selecting the bit present in the position different from the position once selected in the past (the position selected in preceding step (b)), since L−N is not divisible by N, the computer (101) selects [(L−N)/N]+1 or [(L−N)/N] bits among the higher L−N bits of an input key. [(L−N)/N] is the largest integer equal to or smaller than (L−N)/N. In FIG. 2G, since (L−N)=27 is not divisible by N=8, [(L−N)/N]+1=4 bits are selected three times and [(L−N)/N]=3 bits are selected five times.

Figure 3A:
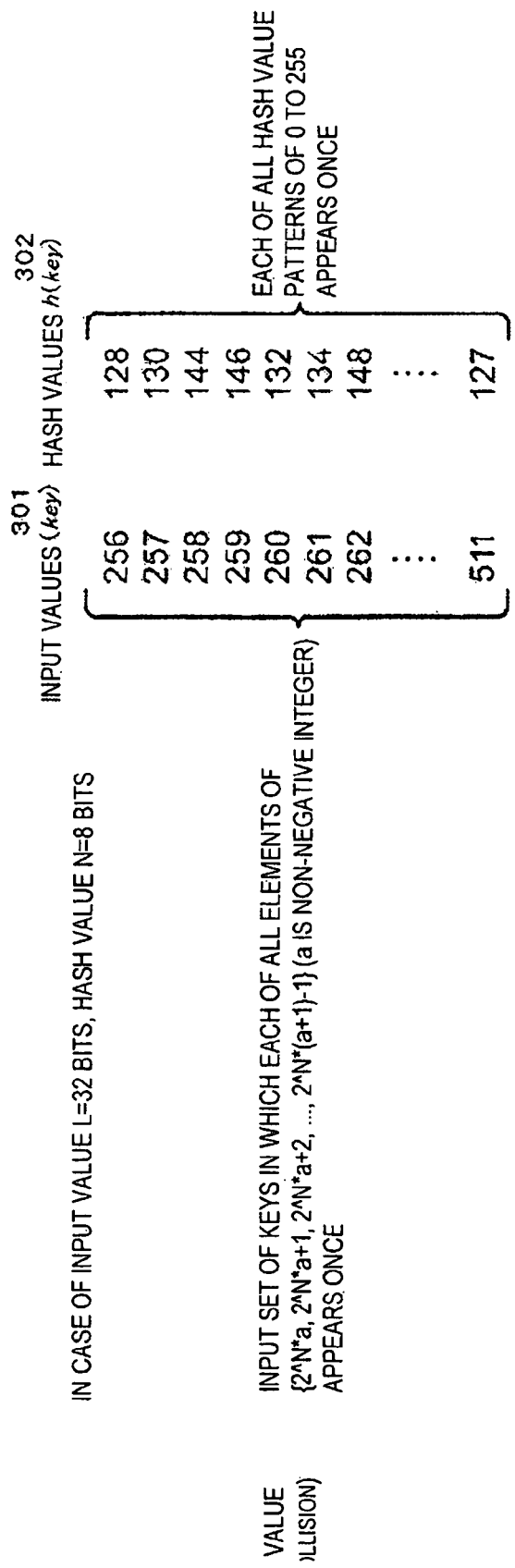
FIG. 3A is a diagram in which a hash function generated according to the embodiment of the present invention outputs all $2^N$ hash values when $2^N$ keys that have the same higher L–N bits and that cover all bit patterns of the lower N bits are input to the hash function.

FIG. 3A is an illustration of an embodiment of an invention according to claim 8. A diagram is shown in which a hash function generated according to the embodiment of the present invention outputs all $2^N$ hash values when $2^N$ keys that have the same higher L−N bits and that cover all bit patterns of the lower N bits are input to the hash function.

It is assumed that the length of an input value (key) is 32 bits (L=32) and the length of a hash value h (key) is 8 bits (N=8).

The computer (101) inputs a set of keys, in each of which all elements of $2^N$ keys $\{2^N \times a, 2^N \times a+1, 2^N \times a+2, \ldots,$ and $2^N \times (a+1)-1\}$ (a is a non-negative integer) that have the same higher L−N bits appear once, to the hash function generated according to the embodiment of the present invention as input values (301). The hash function outputs hash values (302) in which each of all hash values from 0 to 255 always appears once. Note that the $2^N$ keys that have the same higher L−N bits may be input in any order.

When the set of the keys, in each of which all the elements of $2^N$ keys $\{2^N \times a, 2^N \times a+1, 2^N \times a+2, \ldots, \text{and } 2^N \times (a+1)-1\}$ (a is a non-negative integer) that have the same higher L−N bits appear once, are input as the input values (301) in this way, the largest distance between continuous two hash values is $2^N-1$.

FIG. 3B is an illustration of an embodiment of an invention according to claim 9. A diagram is shown in which the hash function generated according to the embodiment of the present invention outputs hash values (likely to cause collision) when random keys are input.

It is assumed that the length of an input value (key) is 32 bits (L=32) and the length of a hash value h (key) is 8 bits (N=8).

The computer (101) inputs random keys to the hash function generated according to the embodiment of the present invention as input values (311). The hash function outputs hash values (312). The hash values are likely to cause collisions. In the hash values (312), there are collisions of hash values 125 and 129 caused by different keys. Note that, in the random key, higher L−N bits do not have to be the same.

Figure 4:
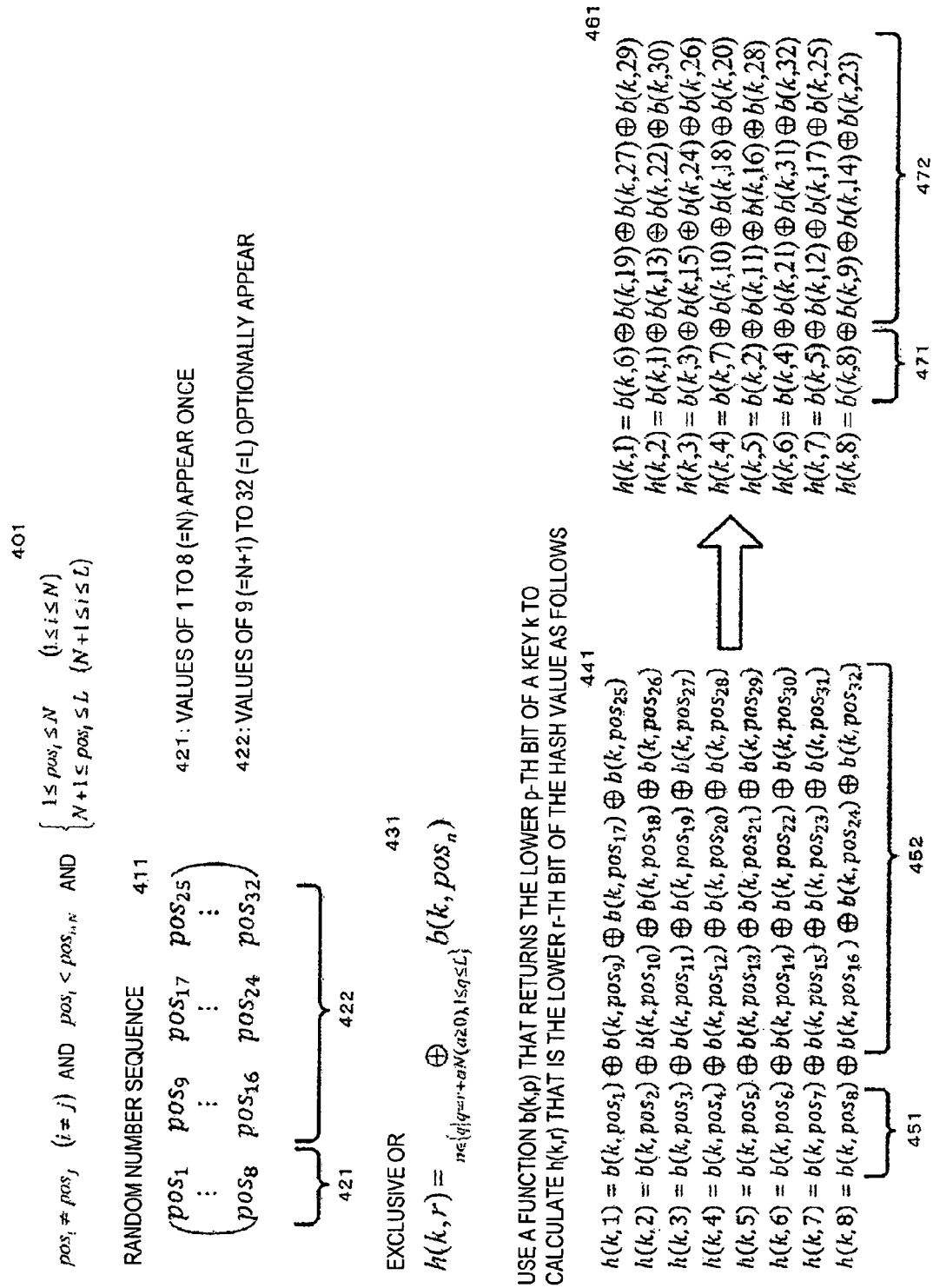
FIG. 4 shows an example of operation for creating a hash function that can be generated according to the embodiment of the present invention.

FIG. 4 shows an example of operation for creating a hash function generated according to the embodiment of the present invention.

It is assumed that the length of a hash value generated by the hash function is N bits and the length of an input key is L bits (N≤L).

A random number sequence pos satisfying a condition indicated by Expression 401 in FIG. 4 is prepared. Operation for creating one random number sequence is equivalent to operation for generating one hash function. In Expression 401, both of i and j are suffixes of pos and are any integers satisfying 1≤i,j≤L.

A random number sequence (411) is an example of a random number sequence generated to satisfy the condition of Expression 401 when L=32 and N=8. The random number sequence (411) includes a portion (421) where values of 1 to 8 (=N) appear once and a portion (422) where values of 9 (=N+1) to 32 (=L) optionally appear.

For example, the computer (101) can represent a function for returning the lower p-th bit of an input value (key) k as b(k,p), assign the random number sequence pos to p, and calculate h(k,r) that is the lower r-th bit of the hash value according to an expression of exclusive OR indicated by 431 in FIG. 4. After a random number is generated, the method of selecting a bit is fixed and is not changed. In the generation of a hash value, the computer (101) calculates exclusive OR of concerning bits selected on the basis of the fixed bit selecting method.

A specific example in the case of L=32 and N=8 of Expression (431) of exclusive OR is as indicated by 441 in FIG. 4. The specific example (441) of the expression of exclusive OR indicates that, in a portion (451), bits are selected at random from lower 8 bits of a key not to overlap and, in a portion (452), bits are selected at random from upper 24 bits of the key not to overlap or to be allowed to overlap. In Expression (431) of exclusive OR, by changing the random number sequence pos, it is possible to generate a large number of hash functions and generate a hash function family.

Expression (461) of exclusive OR indicates an expression in which a random number sequence is specifically assigned to the specific example (441) of the expression of exclusive OR. A form is shown in which, in Expression (461) of exclusive OR, in a portion (471), bits are selected at random from lower 8 bits of a key not to overlap. In a portion (472), bits are selected at random from higher 24 bits of the key not to overlap.

Figure 5A:
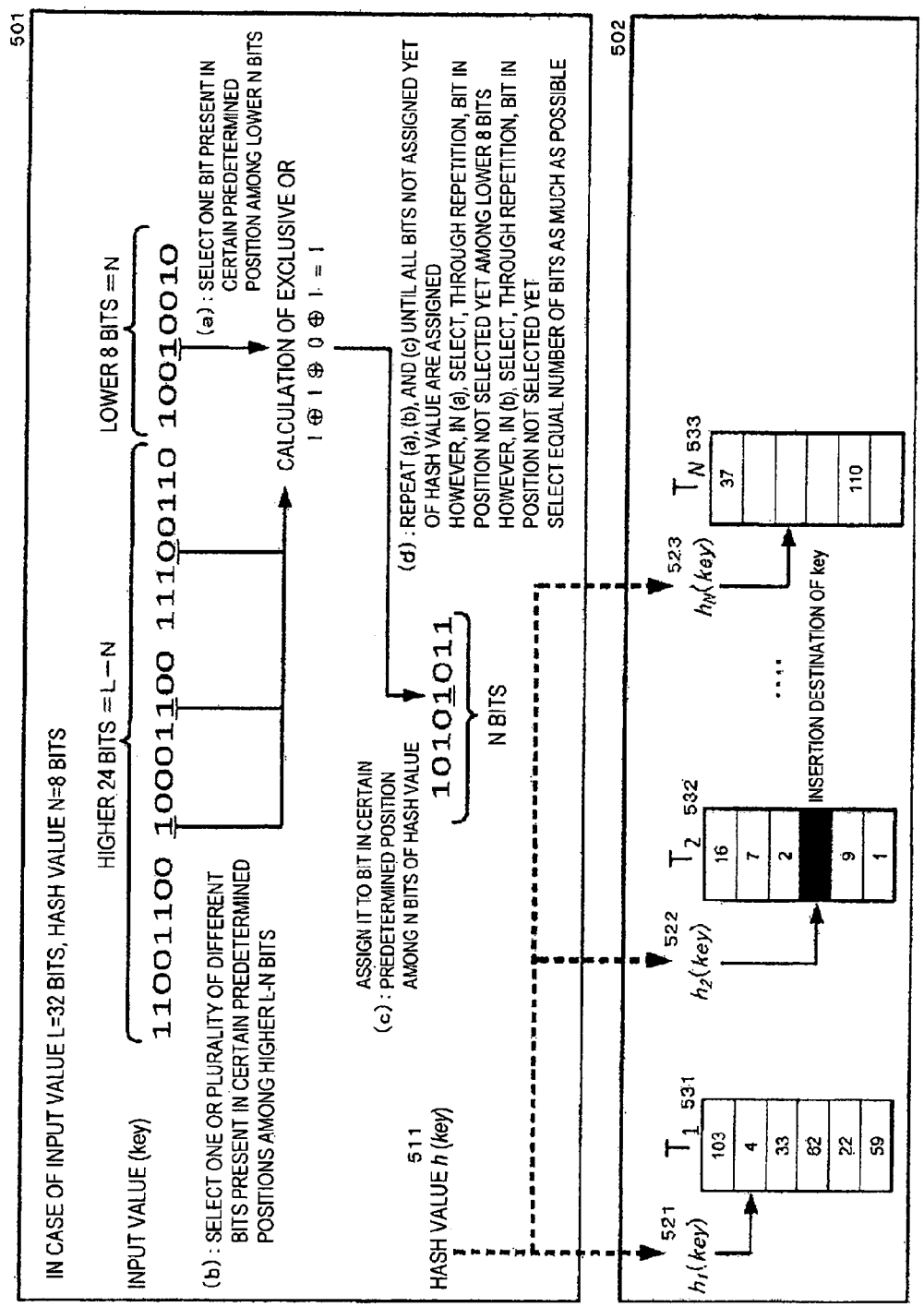
FIG. 5A is a diagram in which the generated hash function family is used in a multi-level hash table (MHT) according to the embodiment of the present invention.

FIG. 5A is a diagram in which the generated hash function family is used in a multi-level hash table (MHT) according to the embodiment of the present invention.

Figure 5B:
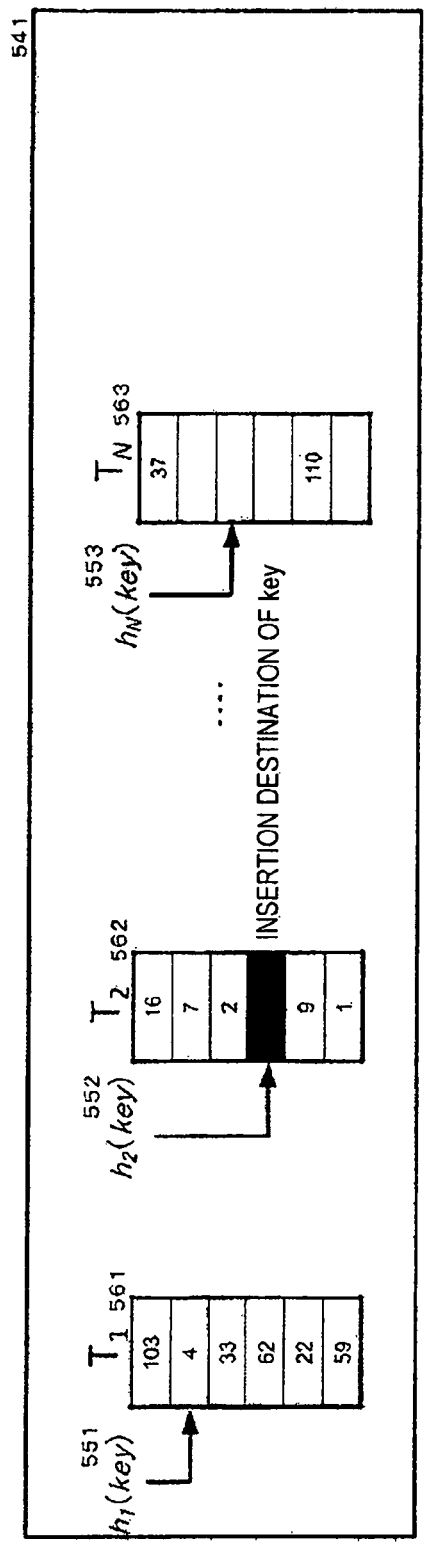
FIG. 5B is a diagram of a conceptual diagram of the multi-level hash table (MHT)

Before explaining the diagram shown in FIG. 5A, a conceptual diagram of the multi-level hash table (MHT) is explained according to a diagram shown in FIG. 5B.

As shown in FIG. 5B, in the MHT, N different hash tables $T_1$ to $T_N$ (561, 562, ..., 563) are prepared. Each of the hash tables $T_1$ to $T_N$ (561, 562, ..., 563) has a capacity of six in this example. In the MHT, in each of the hash tables $T_1$ to $T_N$ (561, 562, ..., 563), N different hash functions $h_1$(key) to $h_N$(key) (551, 552, ..., 553) are prepared. In this way, in the MHT, different hash functions equivalent to the number of tables are necessary like from $h_1$(key) to $h_N$(key).

The computer (101) calculates the hash value of a key (data desired to be inserted to the hash table) using the different hash functions and put the key into the left end of an empty slot among the hash tables $T_1$ to $T_N$ (561, 562, ..., 563). That is, during the insertions of keys, the computer (101) inserts each key to a slot of a leftmost hash table that has an empty slot indicated by the hash function. In the figure, the black slot is the destination of the key.

During retrieval of a key, the computer (101) retrieves equal keys from all slots indicated by the hash functions.

In the MHT, when there is no empty slot in the hash table $T_N$ (563), the MHT overflows. However, when N is sufficiently large, since MHT has a characteristics that most of slots are filled when the MHT overflows, space efficiency of the hash tables is high.

Referring back to FIG. 5A, generation of a hash value shown in the upper part (501) is the same as the diagram (241) in which a hash value is generated shown in FIG. 2E.

The computer (101) repeats steps (a), (b), and (c) and generates a hash value (10101011) (511) until all bits not assigned yet of the hash value are assigned in step (d). In step (a) and (b), by changing the bit selecting method at random, it is possible to generate a large number of different hash functions.

The computer (101) inserts a key to the leftmost hash table that has an empty slot indicated by the hash functions. FIG. 5A indicates that the key is inserted into the hash table $T_2$ (522).

In this way, it is possible to use, in the MHT, the hash function family generated according to the embodiment of the present invention.

Figure 6:
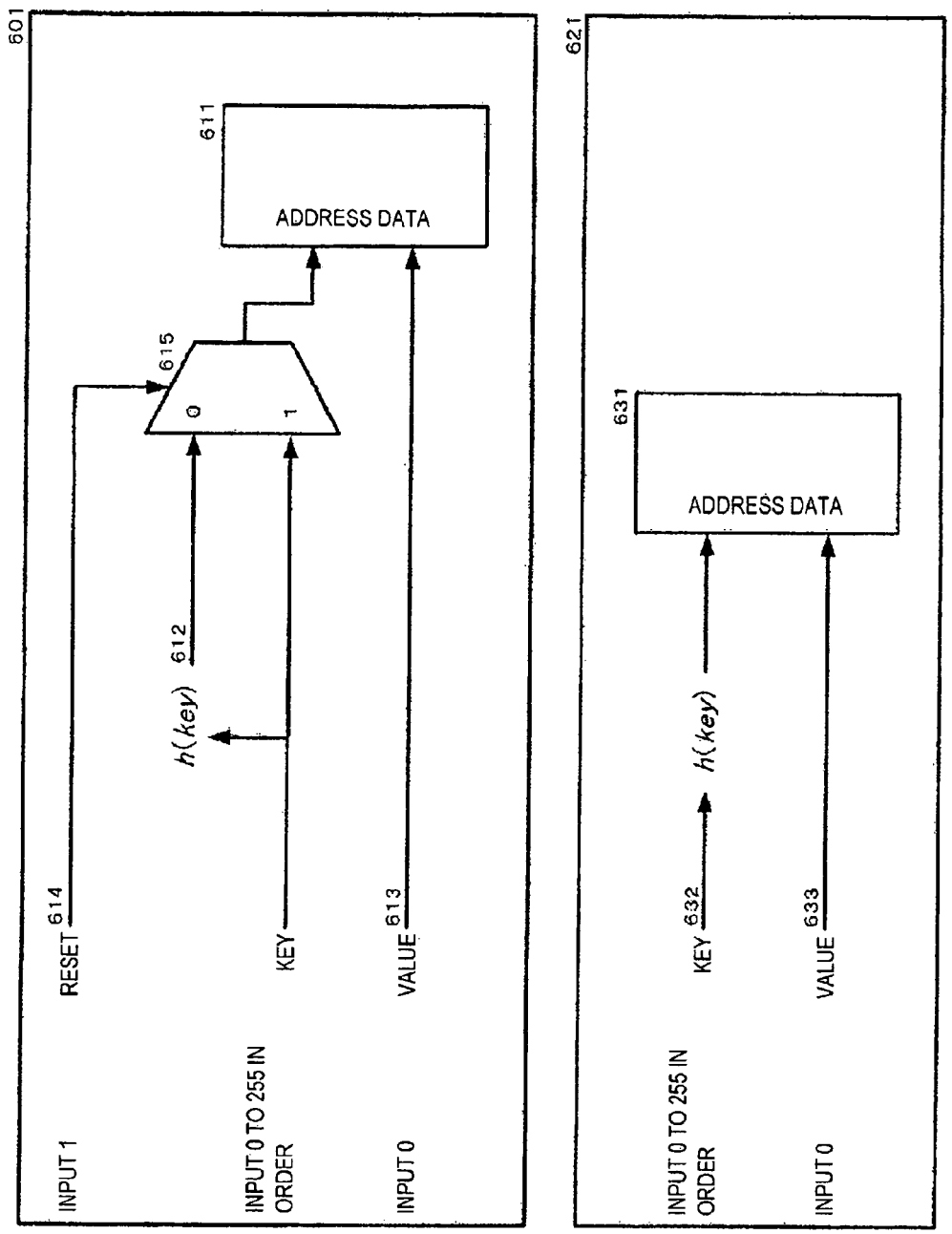
FIG. 6 is a diagram in which a hash function generated according to the embodiment of the present invention uses, making use of the characteristic that all $2^N$ hash values appear, the hash values as memory addresses in zero-clearing a memory block.

FIG. 6 is a diagram in which a hash function generated according to the embodiment of the present invention uses, making use of the characteristic that all $2^N$ hash values appear, the hash values as a memory addresses in zero-clearing a memory block.

A diagram (601) shown in the upper part of FIG. 6 shows a zero-clear circuit according to the related art. The capacity of a memory block (611) is 256 entries. In the zero-clear circuit according to the related art, in order to reset data of the memory block (611) with zero (613), a multiplexer (615) for switching an address (612) generated by the hash function for normal operation and an address (0 to 255 are input) for reset according to the reset (614) signal is necessary. That is, in the zero-clear circuit according to the related art, an additional circuit for reset is necessary.

A diagram (621) shown in the lower part of FIG. 6 shows an example in which data of a memory block (631) is reset with zero using the hash values generated according to the embodiment of the present invention. When the data of the memory block (631) is reset with zero (633) using the hash values generated according to the embodiment of the present invention, the hash values (0 to 255) can be directly used as the memory addresses during reset operation (621). This is because, according to the embodiment of the present invention, a generated hash function outputs all $2^N$ hash values (0 to 255), although in random order, when $2^N$ keys that have the same higher L−N bits and that cover all bit patterns of the lower N bits are input to the hash function. Therefore, the multiplexer (615) shown in the upper part (601) of FIG. 6 is unnecessary in the zero-clear circuit. That is, according to the embodiment of the present invention, the additional circuit for reset is unnecessary. Note that, in the diagram (621) shown in the lower part, the input order of keys may be any order as long as the keys have the same higher L−N bits and covers all bit patterns of the lower N bits are input. The keys do not need to be in a range of 0 to 255.

Figure 7:
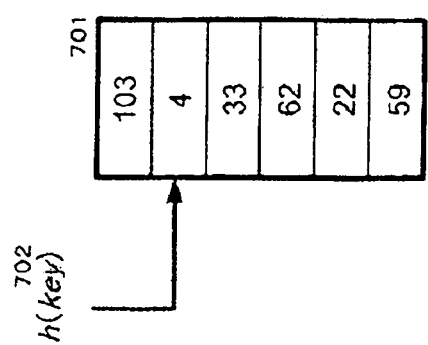
FIG. 7 is a diagram in which a hash table is prepared on a memory block in an FPGA according to the embodiment of the present invention.

FIG. 7 is a diagram in which a hash table is prepared on a memory block in an FPGA according to the embodiment of the present invention.

The computer (101) prepares a hash table on a memory block (701) in an FPGA according to the embodiment of the present invention. For example, the memory block (701) is an M9K block of an Altera Stratix® IV device. Concerning the M9K block, please refer to "3. TriMatrix Embedded Memory Blocks in Stratix IV Devices" described in URL <http://www.altera.com/literature/hb/stratix-iv/stx4_siv51003.pdf>.

The computer (101) inserts a key into an empty memory block indicated by a hash function (702) on a memory block (701).

In this way, it is possible to implement the MHT on the FPGA and use, with a basic calculation function on the FPGA, the hash function family generated according to the embodiment of the present invention. According to the embodiment of the present invention, since a hash value can be calculated by exclusive OR, it is possible to complete the calculation of a hash value within one clock. By building a hash table on the memory block in the FPGA, since data retrieval from the hash table is possible in one clock, it is possible to exhibit calculation performance of the FPGA to the maximum.

FIG. 8A and FIG. 8B are flowcharts of processing for calculating one of hash values of an input key using a generated hash function according to the embodiment of the present invention. A certain predetermined position is determined beforehand. It is determined which bit is selected from the input key to calculate exclusive OR. Determining the certain predetermined position corresponds to generating one hash function. Note that, in the following explanation, a hash value of N bits is generated from an input key of L bits (N≤L).

The flowchart shown in FIG. 8A corresponds to processing described in claim 1.

In step 801, the computer (101) starts processing for calculating a hash value.

In step 802, the computer (101) assigns 1 to a variable i. The variable i is 1≤i≤N.

In step 804, the computer (101) selects unselected one bit present in a predetermined position among lower N bits of an input key. The unselected bit is a bit not selected at all throughout 1≤i≤N.

In step 806, the computer (101) assigns the one bit selected in step 804 to a certain predetermined position among the N bits of the hash value (which does not have to be an i-th bit of the hash value).

In step 807, the computer (101) assigns i+1 to the variable i in order to increment i. Note that the computer (101) can set a value of i to a random value not to overlap i in the past. For example, concerning step 807, the step of assigning i+1 to the variable i can be changed to a step of determining whether a value equal to or larger than 1 and equal to or smaller than N not assigned to i yet is present.

In step 808, the computer (101) determines whether i≤N. When i≤N, the computer (101) returns the processing to step 804. On the other hand, when not i≤N (i.e., N<i), the computer (101) advances the processing to end step 809. Note that, in step 804, a bit once selected among the lower N bits is not selected in subsequent repeated steps.

In step 809, the computer (101) ends the processing for calculating the hash value. By changing the certain predetermined position in the flowchart shown in FIG. 8A, the computer (101) can generate a hash function family that consists of a plurality of hash functions.

The flowchart shown in FIG. 8B corresponds to processing described in claim 2.

In step 811, the computer (101) starts processing for calculating a hash value.

In step 812, the computer (101) assigns 1 to the variable i. The variable i is 1≤i≤N.

In step 813, the computer (101) prepares an empty storage region in the memory.

In step 814, the computer (101) selects unselected one bit present in a predetermined position among lower N bits of an input key. The unselected bit is a bit not added to the storage region at all throughout 1≤i≤N. The computer (101) adds the selected one bit to the storage region. Note that a value of exclusive OR is the same even if the calculation order changes. Therefore, the selected bits can be stored in the storage region in any order.

In step 815, the computer (101) selects one or a plurality of bits present in certain predetermined positions among higher L−N bits of the input key. The computer (101) may select any number of a plurality of bits or may select the same number of bits as the number obtained by equally dividing L−N (as much as possible) from unselected bits throughout 1≤i≤N. By selecting the same number of bits as the number obtained by equally dividing L−N (as much as possible) from the unselected bits, it is possible to obtain a hash function with high uniform distribution property.

When the same number of bits as the number obtained by equally dividing L−N (as much as possible) from the unselected bits are selected, if (L−N) is divisible by N, the equally divided number is (L−N)/N.

When the equally divided number of bits are selected, if (L−N) is not divisible by N, the equally divided number is [(L−N)/N]+1 or [(L−N)/N]. [(L−N)/N] is the largest integer equal to or smaller than (L−N)/N. In this case, when the selection in the case of i=N ends, the computer (101) can select each of all bits of the higher L−N bits of the input key once.

When selecting the plurality of bits, the computer (101) can (1) select the plurality of bits from a position where at least one of the higher L−N bits of the input key is different (in other words, selects bits from two or more different positions among the higher L−N bits of the input key) or (2) select the plurality of bits all from different positions among the higher L−N bits of the input key.

Note that the computer (101) may execute step 814 and step 815 in parallel, execute step 814 prior to step 815, or execute step 815 prior to step 814.

In step 816, the computer (101) calculates an exclusive-ORed bit of all the bits in the storage region (i.e., calculates exclusive-ORed bit of all the bits concerning the one bit selected in step 814 and the one or the plurality of bits selected in step 815) and assigns the exclusive-ORed bit to a certain predetermined bit position among N bits of the hash value (which does not have to be an i-th bit of the hash value). For example, when two or more bits are selected in step 815, the computer (101) calculates an exclusive-ORed bit of the three or more bits including the one bit selected in step 814 and the two or more bits selected in step 815. As a result, an exclusive-ORed bit is obtained.

In step 817, the computer (101) assigns i+1 to the variable i in order to increment the variable i. Note that the computer (101) can set a value of i to a random value not to overlap i in the past. For example, concerning step 817, the step of assigning i+1 to the variable i can be changed to a step of determining whether a value equal to or larger than 1 and equal to or smaller than N not assigned to i yet is present.

In step 818, the computer (101) determines whether i≤N. When i≤N, the computer (101) returns the processing to step 813. On the other hand, when not i≤N (i.e., N<i), the computer (101) advances the processing to end step 819. Note that, in step 814, a bit once selected among the lower N bits is not selected in subsequent repeated steps.

In step 819, the computer (101) ends the processing for calculating the hash value. By changing the certain predetermined position in the flowchart shown in FIG. 8B, the computer (101) can generate a hash function family that consists of a plurality of hash functions.

FIG. 9 is a diagram used for access to data in a hash table on the basis of a hash function generated according to the embodiment of the present invention.

In step 901, the computer (101) starts access processing to the data in the hash table. Note that a computer that generates a hash value and a computer that uses the hash value (e.g., performs access to the hash table) may be the same computer or may be different computers.

In step 902, the computer (101) generates a hash value according to the flowcharts shown in FIG. 8A and FIG. 8B.

In step 903, the computer (101) accesses, on the basis of the hash value generated in step 902, a slot in which data is expected to be stored. Any type of data can be stored as long as the data can be represented by a bit sequence.

In step 904, the computer (101) ends the access processing to the data in the hash table.

FIG. 10 is a diagram showing an example of a functional block diagram of a computer that preferably includes a hardware configuration according to FIG. 1A or FIG. 1B and carries out the embodiment of the present invention according to the flowcharts respectively shown in FIG. 8A and FIG. 8B.

A computer (1001) includes, for example, the components shown in the computer (101) shown in FIG. 1A, for example, the CPU (102), the main memory (103), and the disk (108).

The computer (1001) includes bit selecting means (1011) and bit assigning means (1012). Note that, in the following explanation, a hash value of N bits is generated from an input key of L bits (N≤L).

The bit selecting means (1011) selects one bit present in a certain predetermined position among lower N bits of the input key. The bit assigning means (1012) assigns the one bit selected by the bit selecting means (1011) to a bit in a certain predetermined position among the N bits of the hash value.

The bit selecting means (1011) further selects one or a plurality of bits present in a certain predetermined position among higher L−N bits of the input key. The bit assigning means (1012) calculates an exclusive-ORed bit of all bits concerning the one bit selected from the lower N bits and the one or the plurality of bits selected from the higher L−N bits and assigns the exclusive-ORed bit to a bit in a certain predetermined position among the N bits of the hash value.

The bit selecting means (1011) can execute steps 802 to 804 and 807 to 808 described in FIG. 8A and steps 812 to 815 and 817 to 818 described in FIG. 8B.

The bit assigning means (1012) can execute step 806 described in FIG. 8A and step 816 described in FIG. 8B.

FIG. 11 shows a change in the number of memory blocks used when the generated hash function family is used in the multi-level hash table (MHT) and keys are inserted according to the embodiment of the present invention.

A graph (1101) shows changes of the number of used memory blocks against the number of inserted keys, when 32-bit continuous integer keys starting from $2^N a$ (a is a non-negative integer) was inserted, by using a hash function family (1102) according to the present invention or by using a universal hashing scheme (1103), which is the related art, (the length of an input key was L=32 bits and the length of a hash value was N=8 bits). Note that the graph (1101) indicates that, as the number of memory blocks used is smaller when using the hash function family according to the present invention, the performance of the hash function family is better than that of universal hashing scheme from the viewpoint of memory efficiency.

A graph (1111) shows changes of the number of used memory blocks against the number of inserted keys when 32-bit random integer keys were inserted, by using a hash function family (1112) according to the present invention or by using a universal hashing scheme (1113), which is the related art, (the length of an input key was L=32 bits and the length of a hash value was N=8 bits).

As shown in the graph (1101), when using the hash function (1102) according to the present invention, all slots were able to be always filled when 32-bit continuous integer keys starting from $2^N a$ (a is a non-negative integer) was inserted. That is, when the hash function family generated according to the present invention was used for the MHT and input keys were 32-bit continuous integers starting from $2^N a$ (a is a non-negative integer), memory use efficiency reached 100%. That is, when the MHT overflowed, all the slots were filled because each hash function according to the embodiment of the present invention output different $2^N$ hash values in response to the input of different $2^N$ keys of which higher L−N bits were same and of which lower N bits were different to cover all $2^N$ bit patterns. The hash functions (1102) according to the present invention always realizes satisfactory performance while they use simpler calculation than that of the universal hashing, which is the related art.

As shown in the graph (1111), when 32-bit random integer keys were inserted, the hash functions (1112) according to the present invention was able to realize performance equivalent to the universal hashing (1113), which is the related art, while the hash functions according to the present invention use simpler calculation than that of the universal hashing. The space efficiency reached 99.52% of the entire capacity even though this experiment inserted random keys.

Non-Limiting Examples

The description of the present application has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of calculating a hash value of an input key, the method comprising:
   in response to the input key being inputted into a computer, the computer
   choosing one bit present in a certain predetermined position among lower N bits of the input key;
   selecting one or a plurality of bits present in certain predetermined positions among higher L−N bits of the input key;
   assigning the chosen one bit to a predetermined position among bits of the hash value;
   calculating an exclusive-ORed bit of the chosen one bit and the one or the plurality of bits selected in the step of selecting one or a plurality of bits;
   assigning the exclusive-ORed bit to a predetermined position among the bits of the hash value;
   repeating, until all bits of the hash value are assigned:
   the step of choosing one bit to select a bit not selected yet among the lower N bits of the input key,
   the step of selecting one or a plurality of bits present in certain predetermined positions among higher L-N bits of the input key,
   the calculating step, and
   the step of assigning the exclusive-ORed bit;
   generating one or more hash functions by changing the certain predetermined position among the lower N bits of the input key, wherein a length of the input key is L bits, a length of the hash value is N bits, and N is less than or equal to L; and
   outputting one or more hash values of the input key.

2. The computer-implemented method according to claim 1, wherein the hash value consists of N bits.

3. The computer-implemented method according to claim 1, wherein the step of selecting one or a plurality of bits includes:
   a step of selecting a plurality of bits from two or more different positions among the higher L−N bits of the input key when selecting the plurality of bits; or
   a step of selecting a plurality of bits all from different positions among the higher L−N bits of the input key when selecting the plurality of bits.

4. The computer-implemented method according to claim 1, wherein, when the step of selecting one or a plurality of bits is repeated in the repeating step, the step of selecting the one or the plurality of bits includes a step of selecting a bit in a position different from the positions selected among the higher L−N bits of the input key earlier in the repeating step.

5. The computer-implemented method according to claim 1, wherein, when the step of selecting one or a plurality of bits is repeated in the repeating step, the step of selecting one or a plurality of bits includes a step of selecting an equally-divided number of bits obtained by equally dividing (L−N) bits, where the number of bits is selected when the step of selecting one or a plurality of bits is executed first.

6. The computer-implemented method according to claim 5, wherein, when (L−N) is divisible by N, the equally-divided number of bits is (L−N)/N.

7. The computer-implemented method according to claim 5, wherein, when (L−N) is not divisible by N, the equally-divided number of bits is one of $[(L-N)/N]+1$ and $[(L-N)/N]$, where $[(L-N)/N]$ is a largest integer equal to or smaller than $(L-N)/N$.

8. The computer-implemented method according to claim 1, wherein the higher L−N bits of $2^N$ input keys $\{2^N \times a, 2^N \times a+1, 2^N \times a+2, \ldots, $ and $ 2^N \times (a+1)-1\}$ are the same, where a is a non-negative integer.

9. The computer-implemented method according to claim 8, wherein the input keys are random.

10. The computer-implemented method according to claim 1, wherein the step of choosing one bit includes a step of choosing, on a basis of a predetermined random number sequence generated beforehand, one bit present in a certain predetermined position among lower N bits of the input key, and/or
    the step of selecting one or a plurality of bits includes a step of selecting, on a basis of a predetermined random number sequence generated beforehand, one or a plurality of bits present in certain predetermined positions among higher L−N bits of the input key.

11. The computer-implemented method according to claim 1, wherein, in the assigning step, the step of calculating an exclusive-ORed bit includes a step of calculating $h(k,r)$ that is a lower $r^{th}$ bit of the hash value of an input key k by assigning a random number sequence to p of a function $b(k,p)$ that returns a lower $p^{th}$ bit of the input key k.

12. The computer-implemented method according to claim 1, further comprising the computer executing a step of preparing an empty storage region, wherein
    the step of choosing one bit further includes a step of adding, to the empty storage region, the one bit chosen in the step of choosing one bit, and
    the step of selecting one or a plurality of bits further includes a step of adding, to the empty storage region, the one or the plurality of bits selected in the step of selecting one or a plurality of bits.

13. The computer-implemented method according to claim 1, wherein, when the step of selecting one bit is executed in parallel with the step of selecting one or a plurality of bits, the step of selecting one bit is executed prior to the step of selecting one or a plurality of bits, or the step of selecting one or a plurality of bits is executed prior to the step of selecting one bit.

14. The computer-implemented method according to claim 1, wherein a hash function family comprising the one or more hash functions generated is used in a universal hashing scheme or is used in a multi-level hash table (MHT).

15. The computer-implemented method according to claim 1, further comprising outputting different $2^N$ hash values in response to the inputting different $2^N$ input keys of which higher L−N bits are the same and of which lower N bits are different to cover all $2^N$ bit patterns.

16. The computer-implemented method according to claim 1, further comprising:
    preparing a hash table; and
    accessing data in the hash table on a basis of one or a plurality of the generated hash functions.

17. The computer-implemented method according to claim 16, further comprising preparing the hash table in a field programmable gate array (FPGA) by using memory blocks of the FPGA.

18. A system comprising:
    a memory; and
    a processor communicatively coupled to the memory, wherein, in response to an input key being inputted into the processor, the processor is configured to calculate a hash value of the input key by preparing a hash table on a memory block in a field programmable gate array,
selecting one bit present in a certain predetermined position among lower N bits of the input key,
assigning the selected one bit to a predetermined position among N bits of the hash value, and
repeating, until all bits of the hash value are assigned, the selecting step to select a bit not selected yet among the lower N bits of the input key and the assigning step to assign the bit to a predetermined position of the hash value,
wherein one or more hash functions are generated by changing the certain predetermined position among the lower N bits of the input key, wherein a length of the input key is L bits, a length of a hash value is N bits, and N is less than or equal to L, and wherein the one or more hash functions output hash values.

19. The system according to claim 18, wherein the processor is further configured to execute a step of selecting one or a plurality of bits present in certain predetermined positions among higher L−N bits of the input key, wherein
the step of assigning the selected one bit includes a step of calculating an I exclusive-ORed bit of the one bit selected in the step of selecting one bit and the one or the plurality of bits selected in the step of selecting one or a plurality of bits, and assigning the exclusive-ORed bit to a predetermined position among the N bits of the hash value, and
the repeating step includes of repeating, until all bits of the hash value are assigned, the step of selecting one bit not selected yet in the step of selecting among the lower N bits of the input key, the step of selecting one or a plurality of bits, and the step of assigning.

20. A computer program product for calculating a hash value, the computer program product comprising a non-transitory computer readable storage medium having computer readable program code embodied therewith, the computer readable program code configured to perform:
preparing, in response to an input key, a hash table on a memory block in a field programmable gate array;
selecting one bit present in a certain predetermined position among lower N bits of the input key;
assigning the selected one bit to a predetermined position among N bits of the hash value; and
repeating, until all bits of the hash value are assigned, the selecting step to select a bit not selected yet among the lower N bits of the input key and the assigning step to assign the bit to a predetermined position of the hash value,
wherein one or more hash functions are generated by changing a certain predetermined position for selecting a bit, wherein a length of the input key is L bits, a length of the hash value is N bits, and N is less than or equal to L, and wherein the one or more hash functions output hash values of the input key.

* * * * *